United States Patent
Enomoto et al.

(10) Patent No.: US 12,404,425 B2
(45) Date of Patent: Sep. 2, 2025

(54) MULTILAYER FILM AND MOLDED BODY PROVIDED WITH SAME

(71) Applicant: KURARAY CO., LTD., Okayama (JP)

(72) Inventors: Keisuke Enomoto, Ibaraki (JP); Kazuki Iishiba, Ibaraki (JP); Satoru Akiho, Ibaraki (JP); Daisuke Konishi, Ibaraki (JP)

(73) Assignee: KURARAY CO., LTD., Okayama (JP)

( * ) Notice: Subject to any disclaimer, the term of this patent is extended or adjusted under 35 U.S.C. 154(b) by 967 days.

(21) Appl. No.: 17/046,486

(22) PCT Filed: Apr. 12, 2019

(86) PCT No.: PCT/JP2019/015995
§ 371 (c)(1),
(2) Date: Dec. 16, 2020

(87) PCT Pub. No.: WO2019/198823
PCT Pub. Date: Oct. 17, 2019

(65) Prior Publication Data
US 2021/0130654 A1   May 6, 2021

(30) Foreign Application Priority Data
Apr. 13, 2018   (JP) .................................. 2018-077471

(51) Int. Cl.
| | | |
|---|---|---|
| C09J 7/38 | (2018.01) | |
| B29C 45/14 | (2006.01) | |
| B29C 48/00 | (2019.01) | |
| B29C 48/14 | (2019.01) | |
| B29C 48/18 | (2019.01) | |
| C09J 7/24 | (2018.01) | |
| C09J 7/29 | (2018.01) | |
| C09J 123/12 | (2006.01) | |
| C09J 125/10 | (2006.01) | |
| C09J 153/02 | (2006.01) | |
| B29K 21/00 | (2006.01) | |
| B29K 23/00 | (2006.01) | |

(52) U.S. Cl.
CPC ........... *C09J 7/29* (2018.01); *B29C 45/14688* (2013.01); *B29C 48/0021* (2019.02); *B29C 48/14* (2019.02); *B29C 48/18* (2019.02); *C09J 7/241* (2018.01); *C09J 7/387* (2018.01); *C09J 123/12* (2013.01); *C09J 125/10* (2013.01); *C09J 153/02* (2013.01); *B29C 2045/14696* (2013.01); *B29C 2045/14704* (2013.01); *B29K 2021/003* (2013.01); *B29K 2023/12* (2013.01); *B32B 2307/558* (2013.01); *C09J 2203/306* (2013.01); *C09J 2203/354* (2020.08); *C09J 2301/122* (2020.08); *C09J 2301/162* (2020.08); *C09J 2301/302* (2020.08); *C09J 2301/312* (2020.08); *C09J 2423/106* (2013.01); *C09J 2453/00* (2013.01)

(58) Field of Classification Search
None
See application file for complete search history.

(56) References Cited

U.S. PATENT DOCUMENTS

| | | | | |
|---|---|---|---|---|
| 4,239,859 | A * | 12/1980 | Miller | ................... C08F 297/04 |
| | | | | 525/267 |
| 4,696,984 | A * | 9/1987 | Carbonaro | ............... C08F 36/08 |
| | | | | 526/143 |
| 6,657,000 | B1 * | 12/2003 | De Keyzer | ........... C08F 297/04 |
| | | | | 524/270 |
| 9,243,163 | B2 * | 1/2016 | Salazar | ..................... C08K 3/20 |
| 10,792,901 | B2 * | 10/2020 | Isojima | .................. B32B 27/34 |
| 2002/0009935 | A1 * | 1/2002 | Hsiao | ..................... D03D 15/41 |
| | | | | 428/36.1 |
| 2002/0114947 | A1 | 8/2002 | Tanabe et al. | |
| 2006/0240208 | A1 | 10/2006 | Ishikawa et al. | |
| 2007/0182898 | A1 | 8/2007 | Yamaoka et al. | |
| 2009/0117379 | A1 | 5/2009 | Toyoshima et al. | |

(Continued)

FOREIGN PATENT DOCUMENTS

| | | |
|---|---|---|
| CN | 101189317 | 5/2008 |
| CN | 103305147 | 9/2013 |

(Continued)

OTHER PUBLICATIONS

Machine translation of JP 2004115657 A (Year: 2004).*
Machine translation of WO 2019097889 A1 (Year: 2019).*
Machine translation of WO 2017200014 A1 (Year: 2017).*
Daogang HE, Developments of Rubber Adhesives (1988), along with an English translation.

(Continued)

*Primary Examiner* — Frank D Ducheneaux
(74) *Attorney, Agent, or Firm* — GREENBLUM & BERNSTEIN, P.L.C.

(57) ABSTRACT

A multilayer film and a decorative film, each of which is excellent in chipping resistance, exhibits favorable adhesive properties to a variety of resin materials, such as polypropylene and ABS, and a molded body provided with such a film. The multilayer film includes three layers of an impact absorption layer (a), a base material layer (b), and a pressure sensitive adhesive layer (c) disposed in this order, wherein a thermoplastic polymer composition constituting the impact absorption layer (a) is composed of at least one block copolymer containing a polymer block (X) containing a structural unit derived from an aromatic vinyl compound and a polymer block (Y) containing a structural unit derived from a conjugated diene compound, or a hydrogenated product thereof; and has a loss tangent (tan δ) at 11 Hz in a range of −50 to −20° C. of $3 \times 10^{-2}$ or more.

17 Claims, No Drawings

(56) References Cited

U.S. PATENT DOCUMENTS

| | | |
|---|---|---|
| 2010/0098942 A1 | 4/2010 | Stachnik et al. |
| 2010/0317802 A1 | 12/2010 | Aoyama et al. |
| 2013/0244013 A1 | 9/2013 | Nakayama et al. |
| 2013/0245191 A1 | 9/2013 | Okada et al. |
| 2013/0245208 A1 | 9/2013 | Okada et al. |
| 2014/0004288 A1 | 1/2014 | Wakayama et al. |
| 2016/0053144 A1 | 2/2016 | Sasaki et al. |
| 2017/0275392 A1* | 9/2017 | Flood ................... C08F 8/04 |
| 2018/0002573 A1 | 1/2018 | Kawakita et al. |

FOREIGN PATENT DOCUMENTS

| | | | |
|---|---|---|---|
| CN | 103314052 | 9/2013 | |
| CN | 105308139 | 2/2016 | |
| CN | 106634664 | 5/2017 | |
| CN | 107142032 | 9/2017 | |
| CN | 107206761 | 9/2017 | |
| JP | 2004-115657 | 4/2004 | |
| JP | 2004115657 A * | 4/2004 | ............ C09J 7/0271 |
| JP | 2004-148506 | 5/2004 | |
| JP | 2004-148508 | 5/2004 | |
| JP | 2012-67197 | 4/2012 | |
| JP | 2013-121989 | 6/2013 | |
| JP | 5393436 | 1/2014 | |
| JP | 2018-20487 | 2/2018 | |
| WO | 2014/045657 | 3/2014 | |
| WO | 2016/103714 | 6/2016 | |
| WO | 2017/200014 | 11/2017 | |
| WO | 2017/200059 | 11/2017 | |
| WO | 2018/225780 | 12/2018 | |
| WO | WO-2019097889 A1 * | 5/2019 | ............ B32B 27/30 |

OTHER PUBLICATIONS

International Search Report issued in PCT/JP2019/015995, dated Jul. 9, 2019, along with an English language translation.

\* cited by examiner

MULTILAYER FILM AND MOLDED BODY PROVIDED WITH SAME

TECHNICAL FIELD

The present invention relates to a multilayer film for decoration and a decorative film, each of which is used for vehicle exterior finishes and so on, and a molded body provided with the same.

BACKGROUND ART

Hitherto, paints for vehicle exterior finish to be coated by the spray method have been used for decoration of vehicle exterior finishes. Such paints are used for the purpose of imparting appearance to vehicles as well as protection of vehicle base materials. In particular, in vehicle exterior finish components, there is an occasion that when a pebble or snow melting salt skips to apply an impact against a coating film, the coating film partially lacks. Such a damage is called chipping, and a protective performance against the chipping is referred to chipping resistance. In the case where a pebble collides against a coating film with insufficient chipping resistance, the substrate is exposed due to a damage of the coating film to impair the appearance, and such is problematic. Among vehicles exterior components, a component to be disposed in front of the vehicle, such as a bumper, is liable to occur chipping, and therefore, a coating film used is required to have high chipping resistance.

Now, a polypropylene-based resin is widely used as a material for vehicle bumper. The aforementioned polypropylene-based resin has a variety of advantages, for example, it is strong against the impact, small in a specific gravity, and low in cost. Meanwhile, the polypropylene-based resin that is non-polar is liable to repel the paint and is difficult to hold adherence relative to the coating film resin. In the case where the adherence between the coating film and the resin forming a bumper is low, there is a tendency that the aforementioned chipping resistance becomes worse, too.

In contrast, PTL 1 discloses a primer composition composed of a predetermined formulation, in which both chipping resistance of the coating film and adhesion to polypropylene that is a material of automobile bumper can be made compatible with each other. In addition, PTL 2 discloses a method for forming a multilayer coating film, in which by forming a predetermined multilayer coating film, a multilayer coating film which is excellent in curability, chipping resistance, and finished appearance can be obtained at a low temperature and within a short time.

In recent years, there is proposed a method in which decoration of a vehicle exterior finish or protection of a base material is conducted by using not a paint but a decorative film. In the method of using a decorative film, a tall and stout drying furnace that is essential in the painting process becomes unnecessary, and therefore, it is possible to economize a large quantity of energy. As for a decoration method of using such a film, PTL 3 discloses a protective film for automobile exterior finish composed of a film-like base material made of an olefinic elastomer and an adhesive material layer coated on the side of an adherend of the base material.

In addition, PTL 4 discloses a functional film composed of an adhesive layer, a predetermined urethane resin layer, and a paint coated on the urethane resin layer.

In addition, PTL 5 discloses a decorative film for film-in-mold molding composed of an ionomer layer, a polyester resin layer, and a colored layer, and it is mentioned that when an adhesive layer and a base material layer made of a resin material the same as or similar to a body to be stuck are provided adjacent to the colored layer, the decorative film also favorably adheres to an olefinic resin, such as polypropylene.

CITATION LIST

Patent Literature

PTL 1: JP 2012-67197 A
PTL 2: WO 2014/045657 A
PTL 3: JP 2004-115657 A
PTL 4: JP 2004-148508 A
PTL 5: Japanese Patent No. 5393436

SUMMARY OF INVENTION

Technical Problem

However, in the method of using a paint composition described in PTL 1 and the method for forming a multilayer coating film described in PTL 2, a large quantity of energy is required for drying and curing of the coating film, the environmental load becomes large, and such is problematic.

In addition, in the protective film for automobile exterior finish described in PTL 3, in order to make adhesive properties between the base material layer and the adhesive material layer favorable, it is required to allow a primer layer to intervene, and the process number increases, so that the process becomes complicated. In addition, since the elastic modulus of the base material layer is relatively low, on the occasion of providing for film insert molding, a preform molded article is low in shape retention properties and is liable to be bent, and a molding work thereof is complicated.

The adhesive layer disclosed in the method described in PTL 4 is made of a polyvinyl chloride/vinyl acetate copolymer-based resin, an acrylic resin, or a urethane-based resin, and it is poor in adhesive properties to a polypropylene-based resin, and in the case of not providing the adhesive layer, it is very poor in adhesive properties to the polypropylene-based resin. Thus, such was problematic.

In addition, in the decorative film disclosed in the method described in PTL 5, since the polyester-based polymer film is plasticized and molded, a high temperature (molded at 190° C. in Example 1 of PTL 5) is required, and such caused a problem that designability of the decorative layer is lowered. In addition, since it is necessary to provide the base material layer made of a resin material the same as or similar to a resin that is the stuck body, in the case of sticking an ABS resin which is frequently used for vehicle exterior finishes similar to polypropylene, a film composed of a base material layer different from the polypropylene must be prepared, and thus, the method was complicated.

In the light of the above, an object of the present invention is to provide a multilayer film and a decorative film, each of which is excellent in chipping resistance, exhibits favorable adhesive properties to a variety of resin materials, such as polypropylene and ABS, and also has excellent shape retention properties, and a molded body provided with such a film.

Solution to Problem

The present invention which attains the aforementioned object is concerned with a multilayer film including three layers of an impact absorption layer (a), a base material layer (b), and a pressure sensitive adhesive layer (c) disposed in this order therein, wherein a thermoplastic polymer composition constituting the impact absorption layer (a) is satisfied with the following (a1) and (a2);

(a1) the thermoplastic polymer composition contains a thermoplastic elastomer composed of at least one block copolymer containing a polymer block (X) containing a structural unit derived from an aromatic vinyl compound and a polymer block (Y) containing a structural unit derived from a conjugated diene compound, or a hydrogenated product thereof; and (a2) the thermoplastic polymer composition has a loss tangent (tan δ) at 11 Hz in a range of −50 to −20° C. of $3\times10^{-2}$ or more.

It is preferred that the structural unit derived from the conjugated diene compound constituting the polymer block (Y) is a structural unit derived from at least one selected from butadiene and isoprene.

It is preferred that a decorative layer (d) is disposed at a position coming into contact with the pressure sensitive adhesive layer (c) of the multilayer film.

It is preferred that the decorative layer (d) is a transparent thermoplastic resin selected from any of a (meth)acrylic resin, an ABS resin, a polycarbonate-based resin, and a polyester-based resin.

It is preferred that the decorative layer (d) is composed of a multilayer layer in which any of a metal vapor deposition layer and a printed layer is formed in the transparent thermoplastic resin film.

It is preferred that the decorative layer (d) is composed of a multilayer layer in which the transparent thermoplastic resin is allowed to contain one or both of a pigment and a dye and colored.

Other present inventions are concerned with a decorative film composed of the aforementioned multilayer film and further a molded body in which the aforementioned multilayer film or decorative film is provided on the surface of an adherend.

Advantageous Effects of Invention

The multilayer film containing a decorative layer and an impact absorption layer of the present invention is excellent in chipping resistance, exhibits favorable adhesive properties to a variety of resin materials, such as polypropylene and ABS, and also has excellent shape retention properties. Accordingly, the multilayer film of the present invention can be suitably used especially as a multilayer film to be used for vehicle exterior finishes.

DESCRIPTION OF EMBODIMENTS

The present invention is concerned with a multilayer film including three layers of an impact absorption layer (a), a base material layer (b), and a pressure sensitive adhesive layer (c) disposed in this order therein, wherein a thermoplastic polymer composition constituting the impact absorption layer (a) is satisfied with the following (a1) and (a2):

(a1) the thermoplastic polymer composition contains a thermoplastic elastomer composed of at least one block copolymer containing a polymer block (X) containing a structural unit derived from an aromatic vinyl compound and a polymer block (Y) containing a structural unit derived from a conjugated diene compound, or a hydrogenated product thereof; and (a2) the thermoplastic polymer composition has a loss tangent (tan δ) at 11 Hz in a range of −50 to −20° C. of $3\times10^{-2}$ or more.

The layers (a), (b), (c), and (d) are hereunder described.

The multilayer film of the present invention has at least one impact absorption layer (a). In addition to the impact absorption layer (a), the multilayer film further contains the pressure sensitive adhesive layer (c) and the base material layer (b). In addition, for the purposes of improving an interlayer adhesive force, changing the designability, and so on, other layer than the layers (a), (b), (c), and (d) may be added.

[Impact Absorption Layer (a)]

The impact absorption layer (a) is satisfied with the following (a1) and (a2):

(a1) the thermoplastic polymer composition contains a thermoplastic elastomer (P) composed of at least one block copolymer containing a polymer block (X) containing a structural unit derived from an aromatic vinyl compound and a polymer block (Y) containing a structural unit derived from a conjugated diene compound, or a hydrogenated product thereof; and (a2) the thermoplastic polymer composition has a loss tangent (tan δ) at 11 Hz in a range of −50 to −20° C. of $3\times10^{-2}$ or more.

The impact absorption layer (a) may contain, in addition to the thermoplastic elastomer (P), a polypropylene-based resin (Q) as the need arises.

<Thermoplastic Elastomer (P)>

The thermoplastic elastomer (P) which the thermoplastic polymer composition contains is a block copolymer containing a polymer block (S) containing a structural unit derived from an aromatic vinyl compound and a polymer block (D) containing a structural unit derived from a conjugated diene compound, or a hydrogenated product thereof. The thermoplastic elastomer (P) is one imparting flexibility, favorable mechanical characteristics, and moldability, etc. to the thermoplastic polymer composition and plays a role as a matrix in the composition.

—Polymer Block (S) Containing Aromatic Vinyl Compound Unit—

Examples of the aromatic vinyl compound constituting the polymer block (S) include those containing a structural unit derived from styrene, α-methylstyrene, 2-methylstyrene, 3-methylstyrene, 4-methylstyrene, 4-propylstyrene, 4-cyclohexylstyrene, 4-dodecylstyrene, 2-ethyl-4-benzylstyrene, 4-(phenylbutyl)styrene, 1-vinylnaphthalne, 2-vinylnaphthalene, or the like. The polymer block composed of an aromatic vinyl compound may be composed of a structural unit derived from only one of these aromatic vinyl compounds, or may be composed of structural units derived from two or more thereof. Above of all, those composed of a structural unit derived from styrene, α-methylstyrene, or 4-methylstyrene are preferred.

The polymer block (S) containing a structural unit derived from an aromatic vinyl compound is a polymer block containing preferably 80% by mass or more, more preferably 90% by mass or more, and still more preferably 95% by mass or more of a structural unit derived from an aromatic vinyl compound. Although the polymer block (S) may have only the structural unit derived from an aromatic vinyl compound, so long as the effects of the present invention are not impaired, the polymer block (S) may have a structural unit derived from other copolymerizable monomer together with the foregoing structural unit. Examples of the other copolymerizable monomer include 1-butene, pentene, hexene, butadiene, isoprene, and methyl vinyl ether. In the case where the polymer block (S) has a structural unit derived from other copolymerizable monomer, its content is preferably 20% by mass or less, more preferably 10% by mass or less, and still more preferably 5% by mass or less relative to a total amount of the structural unit derived from an aromatic vinyl compound and the structural unit derived from other copolymerizable monomer.

—Polymer Block (D) Containing Conjugated Diene Compound Unit—

Examples of the structural unit derived from a conjugated diene compound constituting the polymer block (D) include those derived from butadiene, isoprene, 2,3-dimethyl-1,3-butadiene, 1,3-pentadiene, 1,3-hexadiene, or the like. Above all, those derived from butadiene or isoprene are preferred.

The polymer block (D) containing a structural unit derived from the conjugated diene compound may be composed of a structural unit derived from only one of such a conjugated diene compound, or may be composed of a structural unit derived from two or more thereof. In particular, it is preferred that the polymer block (D) is composed of a structural unit derived from butadiene or isoprene, or a structural unit derived from butadiene and isoprene.

The polymer block (D) containing a structural unit derived from the conjugated diene compound is a polymer block containing preferably 80% by mass or more, more preferably 90% by mass or more, and still more preferably 95% by mass or more of the structural unit derived from the conjugated diene compound. Although the polymer block (D) may have only the structural unit derived from the conjugated diene compound, so long as the present invention is not hindered, the polymer block (D) may have a structural unit derived from other copolymerizable monomer together with the foregoing structural unit. Examples of the other copolymerizable monomer include styrene, α-methylstyrene, and 4-methylstyrene. In the case where the polymer block (D) contains the structural unit derived from the other copolymerizable monomer, its proportion is preferably 20% by mass or less, more preferably 10% by mass or less, and still more preferably 5% by mass or less relative to a total amount of the structural unit derived from the conjugated diene compound and the structural unit derived from the other copolymerizable monomer.

The binding form of the conjugated diene constituting the polymer block (D) containing a structural unit derived from the conjugated diene compound is not particularly limited. For example, in the case of butadiene, a 1,2-bond and a 1,4-bond can be taken, and in the case of isoprene, a 1,2-bond, a 3,4-bond, and a 1,4-bond can be taken. Of these, in the case where the polymer block (D) containing a structural unit derived from the conjugated diene compound is composed of a structural unit derived from butadiene, in the case where it is composed of a structural unit derived from isoprene, or in the case where it is composed of a structural unit derived from both butadiene and isoprene, the sum total of the 1,2-bond amount and the 3,4-bond amount in the polymer block (D) is preferably 40 mol % or more from the viewpoint of revelation of a high adhesive performance. A proportion of the sum total of the 1,2-bond amount and the 3,4-bond amount relative to the whole bond amount in the polymer block (D) is preferably 40 to 90 mol %, and more preferably 50 to 80 mol %.

The total amount of the 1,2-bond amount and the 3,4-bond amount can be calculated by the $^1$H-NMR measurement. Specifically, it can be calculated from a ratio of an integrated value of peaks appearing at 4.2 to 5.0 ppm derived from the structural unit having a 1,2-bond and a 3,4-bond and an integrated value of peaks appearing at 5.0 to 5.45 ppm derived from the structural unit having a 1,4-bond.

The binding form of the polymer block(S) containing a structural unit derived from the aromatic vinyl compound and the polymer block (D) containing a structural unit derived from the conjugated diene compound in the thermoplastic elastomer (P) is not particularly limited, and it may be a linear, branched, or radial binding form, or any combination of two or more thereof; however, it is preferably a linear binding form.

When the polymer block(S) containing a structural unit derived from the aromatic vinyl compound is expressed as "a", and the polymer block (D) containing a structural unit derived from the conjugated diene compound is expressed as "b", examples of the linear binding form include a diblock copolymer expressed by "a-b"; a triblock copolymer expressed by "a-b-a" or "b-a-b"; a tetrablock copolymer expressed by "a-b-a-b"; a pentablock copolymer expressed by "a-b-a-b-a" or "b-a-b-a-b"; an $(a-b)_n X$ type copolymer (X represents a coupling residue, and n represents an integer of 2 or more); and a mixture thereof. Of these, a triblock copolymer is preferred, and a triblock copolymer expressed by "a-b-a" is more preferred.

The content of the polymer block (5) containing a structural unit derived from the aromatic vinyl compound in the thermoplastic elastomer (P) is preferably 5 to 75% by mass, more preferably 5 to 60% by mass, and still more preferably 10 to 40% by mass relative to the whole of the thermoplastic elastomer (P) form the viewpoint of its flexibility and mechanical characteristics.

A weight average molecular weight of the thermoplastic elastomer (P) is preferably 30,000 to 500,000, more preferably 50,000 to 400,000, still more preferably 60,000 to 200,000, yet still more preferably 70,000 to 200,000, especially preferably 70,000 to 190,000, and most preferably 80,000 to 180,000 from the viewpoint of its mechanical characteristics and molding processability. Here, the weight average molecular weight is a weight average molecular weight as expressed in terms of polystyrene determined by the gel permeation chromatography (GPC) measurement.

The thermoplastic elastomer (P) may be used alone or may be used in combination of two or more thereof.

Although the production method of the thermoplastic elastomer (P) is not particularly limited, the thermoplastic elastomer (P) can be, for example, produced by an anionic polymerization method. Specifically, examples thereof include (i) a method in which the aforementioned aromatic vinyl compound, the aforementioned conjugated diene compound, and then the aforementioned aromatic vinyl compound are sequentially polymerized by using an alkyl lithium compound as an initiator; (ii) a method in which the aforementioned aromatic vinyl compound and the aforementioned conjugated diene compound are sequentially polymerized by using an alkyl lithium compound as an initiator, and subsequently, a coupling agent is added to undergo coupling; and (iii) a method in which the aforementioned conjugated diene compound and then the aforementioned aromatic vinyl compound are sequentially polymerized by using a dilithium compound as an initiator.

On the occasion of the aforementioned anionic polymerization, the 1,2-bond amount and the 3,4-bond amount of the polymer block (D) in the thermoplastic elastomer (P) can be increased by the addition of an organic Lewis base, and the 1,2-bond amount and the 3,4-bond amount can be easily controlled by the addition amount of the organic Lewis base.

Examples of the organic Lewis base include esters, such as ethyl acetate; amines, such as triethylamine, N,N,N',N'- tetramethylethylenediamine (TMEDA), and N-methylmorpholine; nitrogen-containing heterocyclic aromatic compounds, such as pyridine; amides, such as dimethylacetamide; ethers, such as dimethyl ether, diethyl ether, tetrahydrofuran (THF), and dioxane; glycol ethers, such as ethylene glycol dimethyl ether and diethylene glycol dimethyl ether; sulfoxides, such as dimethyl sulfoxide; and ketones, such as acetone and methyl ethyl ketone.

In the thermoplastic elastomer (P), it is preferred that a part or the whole of the polymer block (D) containing a conjugated diene compound is hydrogenated from the viewpoint of improving heat resistance and weatherability. On that occasion, a hydrogenation rate of the polymer block containing a conjugated diene compound is preferably 80% or more, and more preferably 90% or more. Here, in this specification, the hydrogenation rate is a value obtained by measuring an iodine value of the block copolymer before and after the hydrogenation reaction.

The hydrogenated thermoplastic elastomer (P) can be produced by subjecting an unhydrogenated thermoplastic elastomer (P) to a hydrogenation reaction. The hydrogenation reaction can be conducted by dissolving the unhydrogenated thermoplastic elastomer (P) obtained above in a solvent that is inert to the reaction and a hydrogenation catalyst, or by reacting with hydrogen in the presence of a hydrogenation catalyst in a state where the unhydrogenated thermoplastic elastomer (P) is not isolated from the reaction liquid but used as it is.

As the thermoplastic elastomer (P), commercially available products can be used.

So long as the gist of the present invention is not hindered, the thermoplastic elastomer (P) may have one or more functional groups, such as a carboxy group, a hydroxy group, an acid anhydride group, an amino group, and an epoxy group, in a molecular chain and/or molecular end, as the case may be.

<Polypropylene-Based Resin (Q)>

When the polypropylene-based resin (Q) is contained in the thermoplastic polymer composition, the molding processability is improved, and a film made of the thermoplastic polymer composition is readily prepared. In addition, the mechanical characteristics of the film are improved, and the handling properties become easy. Furthermore, the polypropylene-based resin (Q) is one imparting the adhesive properties to an adherend and is able to favorably adhere to the adherend through a heating treatment.

Examples of the polypropylene-based resin (Q) include a propylene homopolymer and a copolymer of propylene and an α-olefin having 2 to 8 carbon atoms. In the case of the copolymer of propylene and an α-olefin having 2 to 8 carbon atoms (except propylene), examples of the α-olefin in the copolymer include ethylene, butene-1, isobutene, pentene-1, hexene-1, 4-methylpentene-1, and octene-1. Examples of the polypropylene-based resin (Q) include homopolypropylene, a propylene-ethylene random copolymer, a propylene-ethylene block copolymer, a propylene-butene random copolymer, a propylene-ethylene-butene random copolymer, a propylene-pentene random copolymer, a propylene-hexene random copolymer, a propylene-octene random copolymer, a propylene-ethyl-pentene random copolymer, and a propylene-ethylene-hexene random copolymer. In all the structural units which the polypropylene-based resin (Q) has, a proportion of the structural unit derived from the aforementioned α-olefin other than propylene is in a range of preferably 0 to 45 mol %, more preferably 0 to 35 mol %, and still more preferably 0 to 25 mol % from the viewpoint of an affinity with the thermoplastic elastomer (P). In other words, the content of the structural unit derived from propylene in the polypropylene-based resin (Q) is preferably 55 mol % or more, more preferably 65 mol % or more, and still more preferably 75 mol % or more.

The polypropylene-based resin (Q) may be used alone or may be used in combination of two or more thereof.

The polypropylene-based resin (Q) can be synthesized by a conventionally known method, and for example, a propylene homopolymer and a random or block copolymer of propylene and an α-olefin can be synthesized by using a Ziegler-Natta catalyst or a metallocene type catalyst. In addition, as the polypropylene-based resin (Q), commercially available products may be used.

The polypropylene-based resin (Q) may contain a polar group. When the polypropylene-based resin (Q) contains a polar group, not only it becomes possible to favorably adhere to a ceramic, a metal, or a synthetic resin, etc., but also even when a molded article obtained by adhering the thermoplastic polymer composition of the present invention to a ceramic, a metal, or a synthetic resin is exposed to the temperature environment at 60° C. or higher, high adhesive properties are maintained.

Examples of the polar group include a (meth)acryloyloxy group; a hydroxy group; an amide group; a halogen atom, such as a chlorine atom; a carboxy group; and an acid anhydride group. Although the production method of the polar group-containing polypropylene-based resin is not particularly limited, it is obtained by subjecting propylene and a polar group-containing copolymerizable monomer to random copolymerization, block copolymerization, or graft copolymerization through a known method. Of these, random copolymerization and graft copolymerization are preferred, and graft copolymerization is more preferred.

Besides, the polar group-containing polypropylene-based resin is also obtained by subjecting the polypropylene-based resin to a reaction, such as oxidation and chlorination, through a known method.

The polar group-containing polypropylene-based resin may also be one resulting from copolymerization of an α-olefin other than propylene together with propylene with a polar group-containing copolymerizable monomer. Examples of the foregoing α-olefin include ethylene, 1-butene, 1-pentene, 1-hexene, 1-octene, 4-methyl-1-pentene, and cyclohexene. The foregoing α-olefin can be copolymerized with the polar group-containing copolymerizable monomer through a known method, and examples of the foregoing method include random copolymerization, block copolymerization, and graft copolymerization. A proportion of the structural unit derived from the α-olefin other than propylene relative to all the structural units which the polar group-containing polypropylene-based resin has is preferably 0 to 45 mol %, more preferably 0 to 35 mol %, and still more preferably 0 to 25 mol %.

Examples of the polar group-containing copolymerizable monomer include vinyl acetate, vinyl chloride, ethylene oxide, propylene oxide, acrylamide, and an unsaturated carboxylic acid or an ester or anhydride thereof. Of these, an unsaturated carboxylic acid or an ester or anhydride thereof is preferred. Examples of the unsaturated carboxylic acid or an ester or anhydride thereof include (meth)acrylic acid, a (meth)acrylic acid ester, maleic acid, maleic anhydride, fumaric acid, itaconic acid, itaconic anhydride, himic acid, and himic anhydride. Of these, maleic acid and maleic anhydride are more preferred. These polar group-containing copolymerizable monomers may be used alone or may be used in combination of two or more thereof.

From the viewpoint of adhesive properties, as the polar group-containing polypropylene-based resin, a polypropylene having a carboxy group as the polar group, namely a carboxylic acid-modified polypropylene-based resin is preferred, and a maleic acid-modified polypropylene-based resin or a maleic anhydride-modified polypropylene-based resin is more preferred.

Specifically, examples of the (meth)acrylic acid ester exemplified as the polar group-containing copolymerizable monomer include alkyl acrylate esters, such as methyl acrylate, ethyl acrylate, n-propyl acrylate, isopropyl acrylate, n-butyl acrylate, isobutyl acrylate, n-hexyl acrylate, isohexyl acrylate, n-octyl acrylate, isooctyl acrylate, and 2-ethylhexyl acrylate; and alkyl methacrylates, such as methyl methacrylate, ethyl methacrylate, n-propyl methacrylate, isopropyl methacrylate, n-butyl methacrylate, isobutyl methacrylate, n-hexyl methacrylate, isohexyl methacrylate, n-octyl methacrylate, isooctyl methacrylate, and 2-ethylhexyl methacrylate. These (meth)acrylic acid esters may be used alone or may be used in combination of two or more thereof.

The polar group which the polar group-containing polypropylene-based resin has may be subjected to a post-treatment after the polymerization. For example, a (meth) acrylic acid group or a carboxy group may be neutralized with a metal ion to form an ionomer, or may be esterified with methanol, ethanol, or the like. In addition, hydrolysis of vinyl acetate or the like may be conducted.

A melt flow rate (MFR) of the polypropylene-based resin (Q) under a condition at 230° C. and at a load of 2.16 kgf (21.18 N) is preferably 0.1 to 300 g/10 min, more preferably 0.1 to 100 g/10 min, still more preferably 0.1 to 70 g/10 min, yet still more preferably 0.1 to 50 g/10 min, even yet still more preferably 1 to 30 g/10 min, even still more preferably 1 to 20 g/10 min, and especially preferably 1 to 15 g/10 min. When the MFR of the polypropylene-based resin (Q) under the aforementioned condition is 0.1 g/10 min or more, favorable molding processability is obtained. On the other hand, when the foregoing MFR is 300 g/10 min or less, the mechanical characteristics are readily revealed.

From the viewpoint of heat resistance, a melting point of the polypropylene-based resin (Q) is preferably 100° C. or higher, more preferably 100 to 170° C., and still more preferably 110 to 145° C.

The thermoplastic polymer composition of the present invention may contain the polypropylene-based resin (Q) in an amount of 50 parts by mass or less based on 100 parts by mass of the thermoplastic elastomer (P). When the content of the polypropylene-based resin (Q) is more than 50 parts by mass, the thermoplastic polymer composition becomes hard, so that flexibility and mechanical characteristics are occasionally hardly revealed. The content of the polypropylene-based resin (Q) is preferably 50 parts by mass or less, and more preferably 40 parts by mass or less based on 100 parts by mass of the thermoplastic elastomer (P).

<Other Component>

The thermoplastic polymer composition of the present invention may optionally contain a tackifying resin, a softening agent, an antioxidant, a lubricant, a light stabilizer, a processing aid, a coloring agent, such as a pigment and a dye, a flame retardant, an antistatic agent, a matting agent, a silicone oil, an antiblocking agent, an ultraviolet light absorber, a mold releasing agent, a blowing agent, an antimicrobial agent, an antifungal agent, a flavor, or the like within a range where the effects of the present invention are not impaired.

Examples of the tackifying agent include an aliphatic unsaturated hydrocarbon resin, an aliphatic saturated hydrocarbon resin, an alicyclic unsaturated hydrocarbon resin, an alicyclic saturated hydrocarbon resin, an aromatic hydrocarbon resin, a hydrogenated aromatic hydrocarbon resin, a rosin ester resin, a hydrogenated rosin ester resin, a terpene phenol resin, a hydrogenated terpene phenol resin, a terpene resin, a hydrogenated terpene resin, an aromatic hydrocarbon-modified terpene resin, a coumarone-indene resin, a phenol resin, and a xylene resin.

Examples of the softening agent include a softening agent which is generally used for rubber or plastics. Examples thereof include a paraffinic, naphthenic, or aromatic process oil; a phthalic acid derivative, such as dioctyl phthalate and dibutyl phthalate; and a white oil, a mineral oil, an oligomer of ethylene and an α-olefin, a paraffin wax, a liquid paraffin, a polybutene, a low molecular weight polybutadiene, and a low molecular weight polyisoprene.

Examples of the antioxidant include hindered phenol-based, phosphorus-based, lactone-based, and hydroxy-based antioxidants. Of these, the hindered phenol-based antioxidant is preferred.

The thermoplastic polymer composition of the present invention may optionally contain an antioxidant, a lubricant, a light stabilizer, a processing aid, a coloring agent, such as a pigment and a dye, a flame retardant, an antistatic agent, a matting agent, a silicone oil, an antiblocking agent, an ultraviolet light absorber, a mold releasing agent, a blowing agent, an antimicrobial agent, an antifungal agent, a flavor, or the like within a range where the effects of the present invention are not impaired.

<Production Method of Thermoplastic Polymer Composition>

Although a method of preparing the thermoplastic polymer composition of the present invention is not particularly limited, in order to enhance dispersibility of each of components constituting the thermoplastic polymer composition, for example, a method of melt kneading and mixing is recommended. In this case, the thermoplastic elastomer (P) and the polypropylene-based resin (Q) and other component to be optionally added may be simultaneously mixed and melt kneaded. The mixing operation can be conducted by using an already-known mixing or melt kneading apparatus, for example, a kneader-rudder, an extruder, a mixing roll, or a Bunbury mixer. In particular, from the viewpoint of improving kneadability and compatibility of the thermoplastic elastomer (P) and the polypropylene-based resin (Q), a twin-screw extruder is preferably used. A temperature during mixing and kneading may be appropriately adjusted depending upon the melting temperature of the used thermoplastic elastomer (P) and polypropylene-based resin (Q), or the like, and typically, the mixing may be conducted at a temperature within a range of 110° C. to 300° C.

In the light of the above, the thermoplastic polymer composition of the present invention can be obtained in any arbitrary form of a pellet and a powder. The obtained thermoplastic polymer composition can be molded in a variety of shapes, such as a film, a sheet, a plate, a pipe, a tube, a rod-like body, and a granular body. Such a production method is not particularly limited, the thermoplastic polymer composition can be molded through a conventional molding method of every kind, for example, injection molding, blow molding, press molding, extrusion molding, and calender molding.

[Pressure Sensitive Adhesive Layer (c)]

A material forming the aforementioned pressure sensitive adhesive layer (c) is not particularly limited so long as it is a material which is firmly adhered to the decorative layer (d) and the base material layer (b); however, from the standpoint of favorable molding processability, heat resistance, and mechanical characteristics, it can be a composition composed of a thermoplastic elastomer, and preferably a composition composed of the aforementioned thermoplastic elastomer (P).

[Base Material Layer (b)]

Although the base material layer (b) is not particularly limited, it is preferred to use a thermoplastic resin composed of an amorphous resin or a crystalline resin. In this specification, the "amorphous resin" means a resin not having a definite melting point in the differential scanning calorimetry (DSC) curve, and the "crystalline resin" means a resin having a definite melting point in the DSC curve.

Examples of the amorphous resin include a polystyrene-based resin, a polyvinyl chloride resin, an acrylonitrile styrene resin, an ABS resin (acrylonitrile butadiene styrene resin), a polycarbonate resin, a polyester-based resin, and a (meth)acrylic resin.

Examples of the crystalline resin include an olefinic resin. Above all, from the viewpoint of weatherability, surface smoothness, and rigidity, a (meth)acrylic resin, an ABS resin, a polystyrene-based resin, a polycarbonate-based resin, an olefinic resin, and a polyester-based resin are preferable.

<Methacrylic Resin>

The methacrylic resin has a structural unit derived from methyl methacrylate in an amount of preferably 80% by mass or more, and more preferably 90% by mass or more. In other words, the methacrylic resin has a structural unit derived from a monomer other than methyl methacrylate in an amount of preferably 20% by mass or less, and more preferably 10% by mass or less, and it may also be a polymer composed of only methyl methacrylate as the monomer.

Examples of the monomer other than methyl methacrylate include acrylic acid esters, such as methyl acrylate, ethyl acrylate, n-propyl acrylate, isopropyl acrylate, n-butyl acrylate, isobutyl acrylate, s-butyl acrylate, t-butyl acrylate, amyl acrylate, isoamyl acrylate, n-hexyl acrylate, 2-ethylhexyl acrylate, pentadecyl acrylate, dodecyl acrylate, phenyl acrylate, benzyl acrylate, phenoxyethyl acrylate, 2-hydroxyethyl acrylate, 2-ethoxyethyl acrylate, glycidyl acrylate, allyl acrylate, cyclohexyl acrylate, norbornenyl acrylate, and isobornyl acrylate; methacrylic acid esters other than methyl methacrylate, such as ethyl methacrylate, n-propyl methacrylate, isopropyl methacrylate, n-butyl methacrylate, isobutyl methacrylate, s-butyl methacrylate, t-butyl methacrylate, amyl methacrylate, isoamyl methacrylate, n-hexyl methacrylate, 2-ethylhexyl methacrylate, pentadecyl methacrylate, dodecyl methacrylate, phenyl methacrylate, benzyl methacrylate, phenoxyethyl methacrylate, 2-hydroxyethyl methacrylate, 2-ethoxyethyl methacrylate, glycidyl methacrylate, allyl methacrylate, cyclohexyl methacrylate, norbornenyl methacrylate, and isobornyl methacrylate; unsaturated carboxylic acids, such as acrylic acid, methacrylic acid, maleic anhydride, maleic acid, and itaconic acid; olefins, such as ethylene, propylene, 1-butene, isobutene, and 1-octene; conjugated dienes, such a butadiene, isoprene, and myrcene; aromatic vinyl compounds, such as styrene, α-methylstyrene, p-methylstyrene, and m-methylstyrene; acrylamide, methacrylamide, acrylonitrile, methacrylonitrile, vinyl acetate, vinylpyridine, vinyl ketone, vinyl chloride, vinylidene chloride, and vinylidene fluoride.

The tacticity of the (meth)acrylic polymer is not particularly restricted, and the tacticity may be, for example, isotactic, heterotactic, or syndiotactic.

A weight average molecular weight of the (meth)acrylic polymer is preferably 30,000 or more and 180,000 or less, more preferably 40,000 or more and 150,000 or less, and especially preferably 50,000 or more and 130,000 or less. When the weight average molecular weight is too low, there is a tendency that the mechanical strength of the obtained base material layer is lowered. When the weight average molecular weight is too high, there is a tendency that the flowability of the thermoplastic polymer composition is lowered, and the molding processability is lowered. The weight average molecular weight is a value as expressed in terms of standard polystyrene measured by GPC (gel permeation chromatography).

The molecular weight and the molecular weight distribution of the (meth)acrylic polymer can be controlled by adjusting the kind and amount, etc. of a polymerization initiator and a chain transfer agent.

A production method of the methacrylic resin is not particularly limited, and the methacrylic resin can be obtained by polymerizing a monomer (mixture) containing 80% by mass or more of methyl methacrylate, or copolymerizing it with a monomer other than methyl methacrylate. In addition, as the methacrylic resin, commercially available products may be used. Examples of such a commercially available product include "PARAPET H1000B" (MFR: 22 g/10 min (at 230° C. and 37.3 N)); "PARAPET OF" (MFR: 15 g/10 min (at 230° C. and 37.3 N)), "PARAPET EH" (MFR: 1.3 g/10 min (at 230° C. and 37.3 N)), "PARAPET HRL" (MFR: 2.0 g/10 min (at 230° C. and 37.3 N)), "PARAPET HRS" (MFR: 2.4 g/10 min (at 230° C. and 37.3 N)), and "PARAPET G" (MFR: 8.0 g/10 min (at 230° C. and 37.3 N)) (all of which are trade names, manufactured by Kuraray Co., Ltd.).

As the amorphous resin, an elastic body may be combined and used in order to increase the impact resistance of the (meth)acrylic resin.

<Elastic Body>

Examples of the elastic body include a butadiene-based rubber, a chloroprene-based rubber, a block copolymer, and a multilayer structural body, and these may be used alone or in combination. Of these, from the viewpoint of transparency, impact resistance, and dispersibility, a block copolymer or a multilayer structural body is preferred, and an acrylic block copolymer (G) or a multilayer structural body (M) is more preferred.

—Acrylic Block Copolymer (G)—

The acrylic block copolymer (G) has a methacrylic acid ester polymer block and an acrylic acid ester polymer block. The block copolymer may have only one of each of the methacrylic acid ester polymer block and the acrylic acid ester polymer block, or may have a plurality thereof, respectively.

The acrylic block copolymer (G) has a methacrylic acid ester polymer block (g1) and an acrylic acid ester polymer block (g2). The acrylic block copolymer (G) may have only one of each of the methacrylic acid ester polymer block (g1) and the acrylic acid ester polymer block (g2), or may have a plurality thereof, respectively.

The methacrylic acid ester polymer block (g1) is one containing a structural unit derived from a methacrylic acid ester as a main structural unit. A proportion of the structural unit derived from the methacrylic acid ester in the methacrylic acid ester polymer block (g1) is preferably 80% by mass or more, more preferably 90% by mass or more, still more preferably 95% by mass or more, and especially preferably 98% by mass or more from the viewpoint of stretchability and surface hardness.

A production method of the acrylic block copolymer (G) is not particularly limited, and a method according to known approaches can be adopted. For example, a method of subjecting monomers constituting each polymer block to living polymerization is adopted. Examples of the approach for living polymerization include a method in which anionic polymerization is conducted by using an organic alkali metal compound as a polymerization initiator in the presence of a mineral acid salt, such as an alkali metal or alkaline earth metal salt; a method in which anionic polymerization is conducted by using an organic alkali metal compound as a polymerization initiator in the presence of an organic aluminum compound; a method in which polymerization is conducted by using an organic rare earth metal complex as a polymerization initiator; and a method in which radical polymerization is conducted by using an α-halogenated ester compound as an initiator in the presence of a copper compound. In addition, there is also exemplified a method in which monomers constituting the respective blocks are polymerized by using a polyvalent radical polymerization initiator or a polyvalent radical chain transfer agent, to produce a mixture containing the acrylic block copolymer (G). Of these methods, from the standpoint that the acrylic block copolymer (G) is obtained in a high purity, control of the molecular weight or composition ratio is easy, and the method is economy, a method in which anionic polymerization is conducted by using an organic alkali metal compound as a polymerization initiator in the presence of an organic aluminum compound is preferred.

—Multilayer Structural Body (M)—

The multilayer structural body (M) has at least one layer structure having at least two layers of an inner layer and an outer layer, the inner layer and the outer layer being arranged in this order from the central layer toward the outermost layer. The multilayer structural body (M) may further have a crosslinkable resin layer on the inside of the inner layer or on the outside of the outer layer.

The inner layer is a layer constituted of a crosslinked elastic body resulting from copolymerization of a monomer mixture having an alkyl acrylate ester and a crosslinkable monomer.

As such an alkyl acrylate ester, an alkyl acrylate ester in which the carbon number of the alkyl group is in a range of 2 to 8 is preferably used, and examples thereof include butyl acrylate and 2-ethylhexyl acrylate. A proportion of the alkyl acrylate ester in the entire monomer mixture used for forming the copolymer of the inner layer is in a range of preferably 70 to 99.8% by mass, and more preferably 80 to 90% by mass from the standpoint of impact resistance.

Although a method of producing the multilayer structural body (M) is not particularly limited, the multilayer structural body (M) is preferably produced through emulsion polymerization from the viewpoint of controlling the layer structure thereof.

The (meth)acrylic resin which is used for the base material layer (b) is more preferably a (meth)acrylic resin composition containing a (meth)acrylic polymer and an elastic body, etc. With respect to the content of each of the components, it is preferred that the content of the methacrylic resin is 5 to 90 parts by mass, and the content of the elastic body is 95 to 10 parts by mass based on 100 parts by mass of the sum total of the methacrylic resin and the elastic body. When the content of the elastic body is less than 10 parts by mass, there is a tendency that the impact resistance of the multilayer film becomes worse. On the other hand, when the content of the elastic body exceeds 95 parts by mass or more, there is a tendency that the moldability of the multilayer film becomes worse. More preferably, the content of the methacrylic resin is 10 to 60 parts by mass, and the content of the elastic body is 90 to 40 parts by mass based on 100 parts by mass of the sum total of the methacrylic resin and the elastic body.

As for the thermoplastic resin constituting the base material layer (B), its elastic modulus at an arbitrary temperature in a range of 110 to 160° C. is preferably 2 to 600 MPa. When the elastic modulus is less than 2 MPa, there is a tendency that the elongation during vacuum molding becomes non-uniform, whereas when the elastic modulus is more than 600 MPa, there is a tendency that cracking or fracture occurs during vacuum molding. The elastic modulus is a value rounded to the first decimal place when expressed in terms of an "MPa" unit.

The thermoplastic resin constituting the base material layer (b) may contain a variety of additives, such as an antioxidant, a thermal stabilizer, a lubricant, a processing aid, an antistatic agent, a thermal degradation inhibitor, an ultraviolet light absorber, a light stabilizer, a polymer processing aid, a coloring agent, and an impact resistance aid.

The aforementioned thermoplastic resin can be mixed with other polymer and used. Examples of such other polymer include a polyolefin resin, such as polyethylene, polypropylene (PP), polybutene-1, poly-4-methylpentene-1, and polynorbornene; an ethylenic ionomer; a styrene-based resin, such as polystyrene, a styrene-maleic anhydride copolymer, a high-impact polystyrene, an acrylonitrile-styrene copolymer, an acrylonitrile-butadiene-styrene copolymer (ABS), an acrylonitrile-ethylene-styrene copolymer, an acrylonitrile-acrylic acid ester-styrene copolymer resin, an acrylonitrile-chlorinated polyethylene-styrene copolymer, and a methyl methacrylate-butadiene-styrene copolymer; a methyl methacrylate-styrene copolymer; a polyester resin, such as polyethylene terephthalate (PET) and polybutylene terephthalate; a polyamide, such as nylon 6, nylon 66, and a polyamide elastomer; a polycarbonate, polyvinyl chloride, polyvinylidene chloride, polyvinyl alcohol, an ethylene-vinyl alcohol copolymer, polyacetal, polyvinylidene fluoride, a polyurethane, modified polyphenylene ether, polyphenylene sulfide, and a silicone modified resin; an acrylic rubber and silicone rubber; a styrene-based thermoplastic elastomer, such as a styrene-ethylene/propylene-styrene copolymer, a styrene-ethylene/butadiene-styrene copolymer, and a styrene-isoprene-styrene copolymer; and an olefinic rubber, such as an isoprene rubber, an ethylene propylene rubber, and an ethylene propylene diene rubber.

Although a method of preparing the thermoplastic resin constituting the base material layer (b) is not particularly limited, in order to enhance dispersibility of each of the components constituting the thermoplastic resin, a method of melt kneading and mixing is preferred. The mixing operation can be conducted by using an already-known mixing or melt kneading apparatus, for example, a kneader-rudder, an extruder, a mixing roll, or a Bunbury mixer, and from the viewpoint of improving kneadability and compatibility, a twin-screw extruder is preferably used. A temperature during mixing and kneading may be appropriately adjusted depending upon the melting temperature of the thermoplastic resin to be used, or the like, and typically, the mixing may be conducted at a temperature in a range of 110° C. to 300° C. In the case of conducting melt kneading by using a twin-screw extruder, from the viewpoint of suppressing coloring, it is preferred to conduct melt kneading under reduced pressure and/or a nitrogen atmosphere by using a vent.

The multilayer film of the present invention may be a decorative film in which the base material layer (b) is colored. Examples of a coloring method include a method in which a pigment or a dye is contained in the aforementioned thermoplastic resin itself, thereby coloring the resin itself before film formation; and a dyeing method in which the thermoplastic resin film is dipped in a liquid having a dye dispersed therein and colored. However, it should be construed that the coloring method is not particularly limited thereto.

A total thickness of the multilayer film of the present invention is preferably in a range of 100 to 700 µm, more preferably in a range of 150 to 600 µm, and still more preferably in a range of 200 to 500 µm. When the thickness of the multilayer film is 100 µm or more, the production becomes easy, and excellent impact resistance and reduction of a warp during heating are revealed. When the thickness of the multilayer film is 700 µm or less, there is a tendency that the moldability becomes favorable.

In the multilayer film of the present invention, it is preferred that a thickness of the base material layer (b) is 50 µm or more. When the thickness of the base material layer (b) is thinner than 50 µm, the handling properties are lowered, and hence, such is not preferred. In addition, the thickness of the base material layer (b) is preferably 600 µm or less. When the thickness of the base material layer (b) is thicker than 600 µm, a roll size on the occasion of roll winding of the multilayer film becomes large, and hence, such is not preferred. The thickness of the base material layer (b) is more preferably 50 to 600 µm.

[Decorative Layer (d)]

As the decorative layer (d), a resin film, a nonwoven fabric, an artificial leather, a natural leather, and so on can be used. Above all, it is especially preferred that the decorative layer (d) has at least a layer made of a resin film.

Examples of the resin constituting the resin film include a polyolefin-based resin, a polystyrene resin, a polyvinyl chloride resin, an acrylonitrile styrene resin, an acrylonitrile butadiene styrene resin, a polycarbonate resin, a (meth) acrylic resin, a polyester resin, such as polyethylene terephthalate (PET) and polybutylene terephthalate, a polyamide, such as nylon 6, nylon 66, and a polyamide elastomer, polyvinyl chloride, polyvinylidene chloride, polyvinyl alcohol, an ethylene-vinyl alcohol copolymer, polyacetal, polyvinylidene fluoride, and polyurethane. Above all, from the viewpoint of transparency, weatherability, surface glossiness, and excoriation resistance, a (meth) acrylic resin is preferred. As such a (meth)acrylic resin, a methacrylic resin and a (meth)acrylic resin containing an elastic body are more preferred.

Although a thickness of the decorative layer (d) is not limited at all, it is preferably thin from the viewpoint of molding processability and economy.

Constitution of Decorative Layer (d)

In the case where the (meth)acrylic resin constituting the decorative layer (d) contains a methacrylic resin and an elastic body, with respect to the content of each of the components, it is preferred that the content of the methacrylic resin is 10 to 99 parts by mass, and the content of the elastic body is 90 to 1 part by mass based on 100 parts by mass of the sum total of the methacrylic resin and the elastic body. When the content of the methacrylic resin is less than 10 parts by mass, there is a tendency that the surface hardness of the decorative layer (d) is lowered. More preferably, the content of the methacrylic resin is 30 to 90 parts by mass, and the content of the elastic body is 70 to 10 parts by mass based on 100 parts by mass of the sum total of the methacrylic resin and the elastic body.

The (meth)acrylic resin may contain a variety of additives, such as an antioxidant, a thermal stabilizer, a lubricant, a processing aid, an antistatic agent, a thermal degradation inhibitor, an ultraviolet light absorber, a light stabilizer, a polymer processing aid, a coloring agent, and an impact resistance aid.

A method of preparing the resin serving as a raw material of the resin film is not particularly limited, any method may be adopted for the preparation so long as it is a method in which the aforementioned compounds may be uniformly mixed; however, a method of melt kneading and mixing is preferred.

The decorative layer (d) may be colored. Examples of a coloring method include a method in which a pigment or a dye is contained in the resin itself constituting the resin film, thereby coloring the resin itself before film formation; and a dyeing method in which the resin film is dipped in a liquid having a dye dispersed therein and colored. However, it should be construed that the coloring method is not particularly limited thereto.

The decorative layer (d) may be subjected to printing. Patterns or colors, such as pictures, characters, and figures are imparted through printing. Patterns may be of chromatic colors or achromatic colors. In order to prevent fading of the printing layer, the printing may be conducted on the side coming into contact with the pressure sensitive adhesive layer (c).

The decorative layer (d) may be subjected to vapor deposition. For example, a metal tone and gloss are imparted through indium vapor deposition. The vapor deposition may be conducted on the side coming into contact with the pressure sensitive adhesive layer (c).

In the case of using a (meth)acrylic resin film for the decorative layer (d), the surface is preferably HB or harder, more preferably F or harder, and still more preferably H or harder in terms of a JIS pencil hardness (thickness: 75 µm). When the (meth)acrylic resin film having a hard surface is used for the decorative layer (d), it is hardly scratched, and therefore, it is suitably used as a decorative and protective film on the surface of a molded article requiring designability.

[Production Method of Multilayer Film]

The multilayer film of the present invention is a multilayer film having three layers of the impact absorption layer (a), the base material layer (b), and the pressure sensitive adhesive layer (c) disposed in this order therein. The thermoplastic polymer compositions constituting these layers may be produced through coextrusion by adopting the T-die method; films composed of the respective layers may be laminated; and on the base material layer (b) of a laminated film composed of the impact absorption layer (a) and the base material layer (b), which has been molded through coextrusion, the pressure sensitive adhesive layer (c) may be formed through lamination or coating a solution thereof.

In the case of producing the multilayer film through coextrusion by adopting the T-die method, a silicone roll in which a roll surface is composed of a silicone resin, or silicone coating is applied, is used as a roll for nip molding, and such is suitable because a trouble of winding of the multilayer film around the roll is readily prevented from occurring.

As for the thus obtained multilayer film, the decorative layer (d) is disposed at a position coming into contact with the pressure sensitive adhesive layer (c), whereby the decorative film can be obtained.

A production method of the decorative layer (d) is not particularly limited, and for example, in the case of using an amorphous resin, a known method, such as a T-die method, an inflation method, a melt casting method, and a calender method, can be adopted. From the viewpoint that a film having favorable surface smoothness and low haze is obtained, a method including a step in which a melt kneaded product of the amorphous resin constituting the decorative layer (d) is extruded in a molten state from a T-die, and the both sides thereof are brought into contact with mirror roll surfaces or mirror belt surfaces and molded, is preferred. It is preferable that all of the rolls or belts to be used on this occasion are made of a metal. In the case where the both sides of the thus extruded melt kneaded product are brought into contact with the mirror surfaces to achieve film formation, it is preferred that the both sides of the film are pressurized and pinched by the mirror surfaces rolls or mirror belt surfaces. A pinching pressure by the mirror rolls or mirror belts is preferably higher, and it is preferably 10 N/mm or more, and more preferably 30 N/mm or more in terms of a linear pressure.

The decorative layer (d) may be a film having been subjected to a stretching treatment. By the stretching treatment, the mechanical strength is increased, and cracking hardly occurs. The stretching method is not particularly limited, and examples thereof include a simultaneous biaxial stretching method, a sequential biaxial stretching method, a tubular stretching method, and a rolling method.

As the lamination of the multilayer film relative to the thus obtained decorative layer (d), there is exemplified a method in which the lamination is conducted such that the pressure sensitive adhesive layer (c) and the decorative layer (d) of the multilayer film come into contact with each other.

[Molded Body]

A molded body of the present invention is one in which the multilayer film of the present invention or the decorative film composed of the foregoing multilayer film is provided on the surface of an adherend. More preferably, the molded body of the present invention is one in which the multilayer film of the present invention or the decorative film composed of the multilayer film is provided on the surface of an adherend composed of other thermoplastic resin, a thermosetting resin, a woody substrate, a non-woody fiber substrate, or the like.

Examples of the other thermoplastic resin which is used for the adherend include a polycarbonate resin, a polyethylene terephthalate resin, a polyamide resin, a polyethylene resin, a polypropylene resin, a polystyrene resin, a polyvinyl chloride resin, other (meth)acrylic resin, and an ABS (acrylonitrile-butadiene-styrene copolymer) resin. Examples of the other thermosetting resin include an epoxy resin, a phenol resin, and a melamine resin. In addition, the molded body may also be one in which the multilayer film of the present invention or the decorative film composed of the multilayer film is provided on the surface of an adherend of a woody substrate or a non-woody fiber, such as kenaf.

A production method of the molded body is not particularly limited. For example, the molded body of the present invention can be obtained by subjecting the multilayer film of the present invention or the decorative film composed of the multilayer film to vacuum molding, pressure molding, or compression molding under heating on the surface of an adherend, such as other thermoplastic resin, a thermosetting resin, a woody substrate, and a non-woody substrate. In the molded body, the base material layer (b) in the decorative film of the present invention is provided on the outermost layer of the molded body, whereby it is excellent in surface hardness, surface glossiness, and so on.

Among the production methods of the molded body, another preferred method is a method generally called a simultaneous injection molding-lamination method.

This simultaneous injection molding-lamination method is a method in which the multilayer film of the present invention or the decorative film composed of the foregoing multilayer film is inserted between male and female dies for injection molding, and the molten thermoplastic resin is injected into the dies from the surface of the adhesive layer side of the film, thereby forming an injection molded body as an adherend and simultaneously laminating the multilayer film or the decorative film composed of the foregoing multilayer film on the surface of the injection molded body.

The multilayer film or the decorative film composed of the foregoing multilayer film to be inserted into the dies may be one in a flat form as it is, or may be one shaped in a concave-convex shape through preliminary molding by means of vacuum molding, pressure molding, or the like.

The preliminary molding of the multilayer film or the decorative film composed of the foregoing multilayer film may be conducted by using another molding machine, or the preliminary molding may be conducted within a die of an injection molding machine to be used for the simultaneous injection molding-lamination method.

The multilayer film of the present invention or the molded body provided with the foregoing multilayer on the surface of an adherend can be applied for articles requiring designability while utilizing favorable stretchability and molding processability and excellent bipolar adhesiveness and surface smoothness of the multilayer film. The preliminary molding of the multilayer film or the decorative film composed of the foregoing multilayer film is suitably used for decoration applications, for example, a sign component, such as an advertising tower, a standing signboard, a side signboard, a transom signboard, and a rooftop signboard; a display component, such as a show case, a partition, and a shop display; a lighting component, such as a fluorescent light cover, a mood lighting cover, a lampshade, a lighted ceiling, a lighted wall, and a chandelier; an interior component, such as furniture, a pendant, and a mirror; a construction component, such as a door, a dome, a safety window glass, a room partition, a staircase panel, a balcony panel, and a roof for leisure structures; a transport-related component, such as an automobile interior and exterior finish component and an automobile exterior finish component, e.g., a bumper; an electronic device component, such as an audiovisual nameplate, a stereo cover, a vending machine, a mobile phone, and a personal computer; an incubator, a ruler, a communication board, a greenhouse, a large water tank, an aquarium, a bathroom component, a clock panel, a bathtub, a sanitary material, a desk mat, game equipment, a toy, and wallpaper; a marking film, and various household appliances. The multilayer film of the present invention is provided with the aforementioned characteristics, and therefore, it can be suitably used especially as a decorative film.

EXAMPLES

The present invention is hereunder described in more detail by reference to Examples and so on, but it should be construed that the present invention is by no means limited to these Examples. The respective components used in the Examples and Comparative Examples are as follows.

<Production Example 1> [Synthesis of Thermoplastic Elastomer (P-1)]

By purging a pressure resistant vessel with nitrogen in advance, the pressure resistant vessel was dried. To such a pressure resistant vessel, 50.0 kg of cyclohexane as a solvent, 94.1 g of a 10.5% by mass cyclohexane solution of sec-butyllithium (sec-butyllithium: 9.9 g equivalent) as an anionic polymerization initiator, and 300 g of tetrahydrofuran as a Lewis base were charged. The temperature of such a solution was raised to 50° C. To such a solution, 1.25 kg of styrene (1) was added, and then, a polymerization reaction was conducted for 1 hour. Subsequently, to such a solution, 10.00 kg of isoprene was added, and then, a polymerization reaction was conducted for 2 hours. Furthermore, to such a solution, 1.25 kg of styrene (2) was added, and then, a polymerization reaction was conducted for 1 hour. There was thus obtained a reaction liquid containing a styrene-isoprene-styrene triblock copolymer.

To this reaction liquid, 5% by mass of palladium-on-carbon was added as a hydrogenation catalyst per 100% by mass of the block copolymer. The supported amount of palladium is 5% by mass per 100% by mass % of the palladium-on-carbon. The reaction was conducted for 10 hours in an environment with a hydrogen pressure of 2 MPa and 150° C. The reaction liquid was allowed to cool and release the pressure. Thereafter, the palladium-on-carbon was removed from the reaction liquid by filtration, the filtrate was concentrated, and the concentrate was vacuum dried to obtain a block copolymer (P-1), which is a hydrogenated product of the styrene-isoprene-styrene triblock copolymer.

<Production Example 2>[Synthesis of Thermoplastic Elastomer (P-2)]

In a pressure resistant vessel having been purged with nitrogen and dried, 50.0 kg of cyclohexane as a solvent and 61.1 g of sec-butyllithium (10.5% by mass cyclohexane solution) (6.42 g of sec-butyllithium) as an anionic polymerization initiator was charged, the temperature was raised to 50° C., and then, 0.81 kg of styrene (1) was added to conduct polymerization for 1 hour. Subsequently, 10.87 kg of isoprene was added to conduct polymerization for 2 hours. Furthermore, 0.81 kg of styrene (2) was added to conduct polymerization for 1 hour, to obtain a reaction liquid containing a styrene-isoprene-styrene triblock copolymer.

To this reaction liquid, palladium-on-carbon (supported amount of palladium: 5% by mass) as a hydrogenation catalyst was added in an amount of 5% by mass relative to the aforementioned block copolymer, to conduct a reaction under a condition at a hydrogen pressure of 2 MPa and at 150° C. for 10 hours.

After allowing to cool and release the pressure, the palladium-on-carbon was removed by filtration, the filtrate was concentrated, and the concentrate was vacuum dried to obtain a hydrogenated product (P-2-1) of the styrene-isoprene-styrene triblock copolymer.

According to the same procedures as those of obtaining the aforementioned hydrogenated product (P-2-1), in a pressure resistant vessel having been purged with nitrogen and dried, 50.0 kg of cyclohexane as a solvent and 420.0 g of sec-butyllithium (10.5% by mass cyclohexane solution) (44.1 g of sec-butyllithium) as an anionic polymerization initiator was charged, the temperature was raised to 50° C., and then, 2.83 kg of styrene (1) was added to conduct polymerization for 1 hour. Subsequently, 19.81 kg of isoprene was added to conduct polymerization for 2 hours to obtain a reaction liquid containing a styrene-isoprene diblock copolymer.

This reaction liquid was subjected to hydrogenation in the same manner as that mentioned above, to obtain a hydrogenated product (P-2-2) of the styrene-isoprene diblock copolymer.

The above-obtained (P-2-1) and (P-2-2) were melt kneaded with a twin-screw extruder ZSK26 Mega-Compounder (L/D=54), manufactured by Coperion GmbH at a screw rotation rate of 300 rpm and a melting temperature 200° C., to obtain a styrene-based thermoplastic elastomer composition (P-2).

<Production Example 3>[Synthesis of Thermoplastic Elastomer (P-3)]

In a pressure resistant vessel having been purged with nitrogen and dried, 50.0 kg of cyclohexane as a solvent and 170.6 g of sec-butyllithium (10.5% by mass cyclohexane solution) (17.91 g of sec-butyllithium) as an anionic polymerization initiator was charged, the temperature was raised to 50° C., and then, 1.87 kg of styrene (1) was added to conduct polymerization for 1 hour. Subsequently, 8.75 kg of butadiene was added to conduct polymerization for 2 hours. Furthermore, 1.87 kg of styrene (2) was added to conduct polymerization for 1 hour, to obtain a reaction liquid containing a styrene-butadiene-styrene triblock copolymer.

To this reaction liquid, palladium-on-carbon (supported amount of palladium: 5% by mass) as a hydrogenation catalyst was added in an amount of 5% by mass relative to the aforementioned block copolymer, to conduct a reaction under a condition at a hydrogen pressure of 2 MPa and at 150° C. for 10 hours.

After allowing to cool and release the pressure, the palladium-on-carbon was removed by filtration, the filtrate was concentrated, and the concentrate was vacuum dried to obtain a hydrogenated product (P-3-1) of the styrene-butadiene-styrene triblock copolymer.

According to the same procedures as in (P-3-1), in a pressure resistant vessel having been purged with nitrogen and dried, 50.0 kg of cyclohexane as a solvent and 313.1 g of sec-butyllithium (10.5% by mass cyclohexane solution) (32.9 g of sec-butyllithium) as an anionic polymerization initiator was charged, the temperature was raised to 50° C., and then, 3.75 kg of styrene (1) was added to conduct polymerization for 1 hour. Subsequently, 8.75 kg of butadiene was added to conduct polymerization for 2 hours to obtain a reaction liquid containing a styrene-butadiene diblock copolymer.

This reaction liquid was subjected to hydrogenation in the same manner as in (P-3-1), to obtain a hydrogenated product (P-3-2) of the styrene-isoprene diblock copolymer.

The above-obtained (P-3-1) and (P-3-2) were melt kneaded with a twin-screw extruder ZSK26 Mega-Compounder (L/D=54), manufactured by Coperion GmbH at a screw rotation rate of 300 rpm and a melting temperature 200° C., to obtain a thermoplastic elastomer composition (P-3).

<Production Example 4>[Synthesis of Thermoplastic Elastomer (P-4)]

(1) In a nitrogen-purged pressure resistant vessel equipped with a stirring device, 4.29 kg of α-methylstyrene, 6.25 kg of cyclohexane, 1.18 kg of methylcyclohexane, and 0.15 kg of tetrahydrofuran were added. To this mixed liquid, 0.42 L of sec-butyllithium (1.3 M cyclohexane solution) was added and polymerized at −10° C. for 5 hours. 3 hours after commencement of the polymerization, a weight average molecular weight of the poly-α-methylstyrene (block S) was measured by means of GPC. As a result, it was 6,600 as expressed in terms of polystyrene, and a polymerization conversion rate of α-methylstyrene was 90%. Subsequently, 0.88 kg of butadiene was added to this reaction mixture liquid, stirred at −10° C. for 30 minutes to conduct polymerization of a block t1, and then, 41.8 kg of cyclohexane was added. At this point of time, a polymerization conversion rate of α-methylstyrene was 90%, and a weight average molecular weight (GPC measurement, as expressed in terms of polystyrene) of a polybutadiene block (t1) was 3,700, and a 1,4-bond amount as determined through the $^1$H-NMR measurement was 19%.

Subsequently, to this reaction liquid, 7.71 kg of butadiene was added to conduct a polymerization reaction at 50° C. for 2 hours. The weight average molecule weight (GPC measurement, as expressed in terms of polystyrene) of a polybutadiene block (t2) of a block copolymer (structure: S-t1-t2) obtained by sampling at the point of time was 29,800, and a 1,4-bond amount as determined through the $^1$H-NMR measurement was 60%.

(2) Subsequently, to this polymerization reaction solution, 0.54 L of dichlorodimethylsilane (0.5 M toluene solution) was added and stirred at 50° C. for 1 hour, to obtain a poly(α-methylstyrene)-polybutadiene-poly(α-methylstyrene) triblock copolymer. As a result of calculating a coupling efficiency at this time from an area ratio of UV absorption in GPC of a coupling product (poly(α-methylstyrene)-polybutadiene-poly(α-methylstyrene) triblock copolymer: S-t1-t2-X-t2-t1-S) and an unreacted block copolymer (poly(α-methylstyrene)-polybutadiene block copolymer: S-t1-t2), it was 94%. In addition, as a result of the $^1$H-NMR measurement, the content of the α-methylene styrene polymer block in the poly(α-methylstyrene)-polybutadiene-poly(α-methylstyrene) triblock copolymer was 31%, and the 1,4-bond amount of the whole of the butadiene polymer block T (namely, the block t1 and the block t2) was 55%.

(3) In the polymerization reaction solution obtained in the above (2), a Ziegler-based hydrogenation catalyst formed from nickel octylate and triethylaluminum was added in a hydrogen atmosphere, and a hydrogenation reaction was conducted at a hydrogen pressure of 0.8 MPa and at 80° C. for 5 hours, to obtain a hydrogenated product of a poly(α-methylstyrene)-polybutadiene-poly(α-methylstyrene) triblock copolymer (hereinafter abbreviated as "block copolymer 1"). As a result of the GPC measurement of the obtained block copolymer 1, a main component was a hydrogenated product (coupling product) of the poly(α-methylstyrene)-polybutadiene-poly(α-methylstyrene) triblock copolymer having Mt (peak top of the average molecular weight)=81,000, Mn (number average molecular weight)=78,700, Mw (average molecular weight)=79,500, and Mw/Mn=1.01, and from the area ratio of UV (254 nm) absorption in GPC, it was confirmed that the coupling product was contained in an amount of 94%. In addition, the $^1$H-NMR measurement revealed that the hydrogenation rate of a butadiene block B constituted of the block t1 and the block t2 was 97.5%. There was thus obtained a thermoplastic elastomer (P-4).

[Thermoplastic Elastomer (P-5)]
TUFTEC TMM1943 (MFR at 230° C.=8 g/10 min), manufactured by Asahi Kasei Corporation was used as the thermoplastic elastomer (P-5).

[Polypropylene-Based Resin (Q-1)]
TAFMER™ XM7090 (MFR at 230° C.=7 g/10 min), manufactured by Mitsui Chemicals, Inc. was used as the polypropylene-based resin (Q-1).

[Polypropylene-Based Resin (Q-2)]
TAFMER™ MA8510 (MFR at 230° C.=5.0 g/10 min), manufactured by Mitsui Chemicals, Inc. was used as the polypropylene-based resin (Q-2).

<Production Example 5>[Synthesis of Polar Group-Containing Polypropylene-Based Resin (Q-3)]

42 g of polypropylene "PRIME POLYPRO F327" (manufactured by Prime Polymer Co., Ltd.), 160 mg of maleic anhydride, and 42 mg of 2,5-dimethyl-2,5-di(tertiary butyl peroxide)hexane were melt kneaded with a batch mixer under a condition at 180° C. and at a screw rotation rate of 40 rpm, to obtain a polar group-containing polypropylene-based resin (Q-3). As for the obtained polar group-containing polypropylene-based resin (Q-3), its MFR [at 230° C. and at a load of 2.16 kgf (21.18 N)] was 6 g/10 min, its maleic anhydride concentration was 0.3%, and its melting point was 138° C. The maleic anhydride concentration is a value obtained by titrating the obtained kneaded product with a solution of potassium hydroxide in methanol. In addition, the melting point is a value as read from an endothermic peak of a differential scanning colorimetry curve on the occasion of raising the temperature at a rate of 10° C./min.

[Polypropylene-Based Resin (Q-4)]
UMEX™ 5500, manufactured by Sanyo Chemical Industries, Ltd. was used as the polypropylene-based resin (Q-4).

[Tackifier (R-1)]
YS POLYSTER U115, manufactured by Yasuhara Chemical Co., ltd. was used as the tackifier (R-1).

[Tackifier (R-2)]
ARKON P-90, manufactured by Arakawa Chemical Industries, Ltd. was used as the tackifier (R-2).

[Softening Agent (S-1)]
DIANA PROCESS OIL PW-90, manufactured by Idemitsu Kosan Co., Ltd. was used as the softening agent (S-1).

<Production Example 6>[Synthesis of (Meth)acrylic Resin (L-1)]

To a monomer mixture composed of 95 parts by mass of methyl methacrylate and 5 parts by mass of methyl acrylate, 0.1 parts by mass of a polymerization initiator (2,2'-azobis (2-methylpropionitrile), hydrogen abstraction ability: 1%, one-hour half-life temperature: 83° C.) and 0.28 parts by mass of a chain transfer agent (n-octyl mercaptan) were added and dissolved to obtain a raw material liquid.

100 parts by mass of ion exchanged water, 0.03 parts by mass of sodium sulfate, and 0.45 parts by mass of a suspension dispersing agent were mixed to obtain a mixed liquid. In a pressure resistant polymerization tank, 420 parts by mass of the aforementioned mixed liquid and 210 parts by mass of the aforementioned raw material liquid were charged, and a polymerization reaction was commenced in a nitrogen atmosphere at a temperature of 70° C. while stirring. After elapsing 3 hours from commencement of the polymerization reaction, the temperature was raised to 90° C., stirring was continued for 1 hour, to obtain a liquid having a bead-shaped copolymer dispersed therein. The obtained copolymer dispersion liquid was washed with an appropriate amount of ion exchanged water, and the bead-shaped copolymer was taken out with a bucket type centrifuge. The resulting copolymer was dried with a hot air drier at 80° C. for 12 hours, to obtain a bead-shaped (meth)acrylic resin (L-1). The obtained (meth)acrylic resin (L-1) had a weight average molecular weight of 30,000 and a Tg of 128° C.

<Production Example 7>[Multilayer Structural Body (M-1)]

In a reactor equipped with a stirrer, a thermometer, a nitrogen gas introduction pipe, a monomer introduction pipe, and a reflux condenser, 1,050 parts by mass of ion exchanged water, 0.5 parts by mass of sodium dioctylsulfosuccinate, and 0.7 parts by mass of sodium carbonate were charged. After thoroughly purging the interior of the reactor with a nitrogen gas, the internal temperature of the reactor was set at 80° C. To the reactor, 0.25 parts by mass of potassium persulfate was added, and the resulting mixture was stirred for 5 minutes. Thereafter, 245 parts by mass of a monomer mixture composed of methyl methacrylate/methyl acrylate/allyl methacrylate=94/5.8/0.2 (mass ratio) was continuously added dropwise for 50 minutes. After completion of the dropwise addition, the polymerization reaction was further conducted for 30 minutes.

Subsequently, to the same reactor, 0.32 parts by mass of potassium peroxodisulfate was added and stirred for 5 minutes. Then, 315 parts by mass of a monomer mixture composed of 80.6% by mass of butyl acrylate, 17.4% by mass of styrene, and 2% by mass of allyl methacrylate was continuously added dropwise over 60 minutes. After completion of the dropwise addition, the polymerization reaction was further conducted for 30 minutes.

Subsequently, to the same reactor, 0.14 parts by mass of potassium peroxodisulfate was added and stirred for 5 minutes. Then, 140 parts by mass of a monomer mixture composed of methyl methacrylate and methyl acrylate in a mass ratio of 94/6 was continuously added dropwise and fed over 30 minutes. After completion of the dropwise addition, the polymerization reaction was further conducted over 60 minutes, to obtain a multilayer structural body (M-1).

Production Example 8

20 parts by mass of the multilayer structural body (M-1) obtained in Production Example 7 and 80 parts by mass of the (meth)acrylic resin (L-1) obtained in Production Example 6 were melt kneaded at 230° C. with a twin-screw extruder (TEM-28, manufactured by Toshiba Machine Co., Ltd.) and then extruded in strands, which were then cut to produce pellets (N-1) of the methacrylic resin composition.
[(Meth)Acrylic Resin (L-2)]
PARAPET EH (MFR: 1.3 g/10 min (at 230° C. and 37.3 N)), manufactured by Kuraray Co., Ltd. was used as the (meth)acrylic resin (L-2).

<Production Example 9>[Multilayer Structural Body (M-2)]

In a reactor equipped with a stirrer, a thermometer, a nitrogen gas introduction pipe, a monomer introduction pipe, and a reflux condenser, 200 pars of deionized water, 1 part of sodium dodecylbenzenesulfonate, and 0.05 parts of sodium carbonate were charged. After purging the interior of the reactor with a nitrogen gas to an extent that oxygen was substantially free, the internal temperature of the reactor was set at 80° C. To the reactor, 0.01 parts by mass of potassium persulfate was added, and the resulting mixture was stirred for 5 minutes. Thereafter, a monomer mixture composed of 9.48 parts of methyl methacrylate, 0.5 parts of n-butyl acrylate, and 0.02 pars of allyl methacrylate was continuously added dropwise and fed over 20 minutes. After completion of the addition, the polymerization reaction was further conducted for 30 minutes such that a rate of polymerization was 98% or more.

Subsequently, to the same reactor, 0.03 parts by mass of potassium persulfate was added and stirred for 5 minutes. Then, a monomer mixture composed of 1.45 parts of methyl methacrylate, 27.67 parts of n-butyl acrylate, and 0.88 parts of allyl methacrylate was continuously added dropwise and fed over 40 minutes. After completion of the dropwise addition, the polymerization reaction was further conducted for 30 minutes such that a rate of polymerization was 98% or more.

Subsequently, to the same reactor, 0.06 parts of potassium persulfate was added and stirred for 5 minutes. Then, a monomer mixture containing 53.73 parts of methyl methacrylate, 5.97 parts of n-butyl acrylate, 0.3 parts of n-octyl mercaptan (chain transfer agent) was continuously added dropwise and fed over 100 minutes. After completion of the dropwise addition, the polymerization reaction was further conducted for 60 minutes such that a rate of polymerization was 98% or more, to obtain a latex containing a multilayer structural body (M-2). An average particle diameter in a latex state was 100 nm.

Subsequently, the latex containing the multilayer structural body (M-2) was frozen at −30° C. over 4 hours. The frozen latex was added in warm water at 80° C. in a double volume and dissolved to prepare a slurry. Then, the slurry was held at 80° C. for 20 minutes, dehydrated, and then dried at 70° C., to obtain the multilayer structural body (M-2).

Production Example 10

90 parts by mass of the multilayer structural body (M-2) obtained in Production Example 9 and 10 parts by mass of the (meth)acrylic resin (L-2) were melt kneaded at 230° C. with a twin-screw extruder (TEM-28, manufactured by Toshiba Machine Co., Ltd.) and then extruded in strands, which were then cut to produce pellets (N-2) of the methacrylic resin composition.
[Impact Absorption Layer (a) and Pressure Sensitive Adhesive Layer (c)]

Table 1 shows compositions of Production Example X1 to Production Example X7 used as the impact absorption layer (a) or the pressure sensitive adhesive layer (c) and adhesive strength (PP) and adhesive strength (ABS) of each of the compositions measured by a method as mentioned later.

TABLE 1

|  |  | Production Example X1 | Production Example X2 | Production Example X3 | Production Example X4 | Production Example X5 | Production Example X6 | Production Example X7 |
|---|---|---|---|---|---|---|---|---|
| Thermoplastic elastomer (P-1) | | 20 | | 20 | 20 | 100 | 20 | 40 |
| Thermoplastic elastomer (P-2) | | 40 | | 40 | 60 | | 60 | 40 |
| Thermoplastic elastomer (P-3) | | 40 | 20 | 40 | | | | |
| Thermoplastic elastomer (P-4) | | | 40 | | | | | 20 |
| Thermoplastic elastomer (P-5) | | | 40 | | 20 | | 20 | |
| Polypropylene-based resin (Q-1) | | 10 | | 15 | | | | |
| Polypropylene-based resin (Q-2) | | 20 | | 50 | | | | |
| Polypropylene-based resin (Q-3) | | | | | | 25 | | |
| Polypropylene-based resin (Q-4) | | | | | | | | 10 |
| Tackifier (R-1) | | | | | 50 | | 100 | |
| Tackifier (R-2) | | | | | 25 | | 25 | |
| Softening agent (S-1) | | | | | | | 15 | |
| tan δ (minimum value at −50 to −20° C.) | | 1.5E−01 | 1.4E−01 | 2.4E−01 | 3.2E−02 | 2.7E−02 | 2.3E−02 | 7.5E−02 |
| Adhesive strength (PP) of composition | N/25 mm | 47.7 | 38.3 | 43.3 | 19.1 | 36.7 | 35.5 | 44.5 |
| Adhesive strength (ABS) of composition | N/25 mm | 27.1 | 32.3 | 27.1 | 43.3 | 16.3 | 26.6 | 29.0 |

The measurement of physical properties and the evaluation of adhesive strength of the compositions shown in Production Example X1 to Production Example X7 were conducted in the following manners.

[Evaluation of Viscoelasticity of Composition Forming Impact Absorption Layer (1)]

Pellets of the thermoplastic polymer composition shown in each of Production Examples X1, X3, X5, and X7 were subjected to compression molding with a compression molding machine for 2 minutes under a condition at 200° C. and at a load of 50 kgf/cm², to obtain a sheet having a size of 150×150 mm and 0.5 mm in thickness and composed of the thermoplastic polymer composition. A test piece having a size of 10×20 mm was cut out from the obtained sheet and measured for temperature dispersion with a dynamic viscoelastometer (Rheogel-4000, manufactured by UBM Co., Ltd.), thereby measuring tan δ at −50 to −20° C. of the composition.

[Evaluation of Viscoelasticity of Composition Forming Impact Absorption Layer (2)]

Pellets of the thermoplastic polymer composition shown in each of Production Examples X2, X4, and X6 were dissolved in toluene to prepare a 30% by weight toluene solution. 2 g of the toluene solution was poured into a box having a size of 30 mm in length and 30 mm in width and prepared from a release paper and dried at room temperature for 24 hours. Subsequently, the box made of a release paper and having the toluene solution charged therein was placed in a thermostat at 80° C. and dried for 10 minutes, to obtain a sheet having a size of 30×30 mm and 0.5 mm in thickness and composed of the thermoplastic polymer composition. A test piece having a size of 10×20 mm was cut out from the obtained sheet and measured for temperature dispersion with a dynamic viscoelastometer (Rheogel-4000, manufactured by UBM Co., Ltd.), thereby measuring tan δ at −50 to −20° C. of the composition.

[Adhesive Strength (PP) of Composition Forming Impact Absorption Layer (1)]

Pellets of the thermoplastic polymer composition shown in each of Production Examples X1, X3, X5, and X7 were subjected to compression molding with a compression molding machine for 2 minutes under a condition at 200° C. and at a load of 50 kgf/cm², to obtain a sheet composed of the thermoplastic polymer composition. The sheet having a size of 150×150 mm and composed of the thermoplastic polymer composition (150 mm in length×150 mm in width× 0.5 mm in thickness), a polyimide film (KAPTON Film, manufactured by Du Pont-Toray Co., Ltd., 75 mm in length× 150 mm in width×0.05 mm in thickness), and a polypropylene sheet (MA3, manufactured by Nippon Polypropylene Corporation, 150 mm in length×150 mm in width×0.4 mm in thickness) were superimposed in this order, and disposed in the center of a metal-made spacer having an inside dimension of 150 mm×150 mm and 0.8 mm in thickness. The thus superimposed sheet and metal-made spacer were put between polytetrafluoroethylene-made sheets, and further put between metal plates from the outside. The resultant was subjected to compression molding with a compression molding machine for 2 minutes under a condition at 130° C. and at a load of 50 kgf/cm², to obtain a multilayer film of the composition forming an impact absorption layer and the polypropylene.

The multilayer film was cut in a width of 25 mm as a test piece for adhesive strength measurement, and a peel strength between the composition forming an impact absorption layer and the polypropylene was measured with a peel tester (AGS-X, manufactured by Shimadzu Corporation) under a condition at a peeling angle of 180°, at a tensile speed of 100 mm/min, and an environmental temperature of 23° C. in conformity with JIS K6854-2 and defined as an adhesive strength (PP) of the composition.

[Adhesive Strength (PP) of Composition Forming Impact Absorption Layer (2)]

Pellets of the thermoplastic polymer composition shown in each of Production Examples X2, X4, and X6 were dissolved in toluene to prepare a 30% by weight toluene solution. On a 125 μm-thick sheet made of the methacrylic resin composition obtained in Production Example 8, the 30% by weight toluene solution was coated in a wet thickness of 126 μm by using a #55 bar coater. Subsequently, the resultant was dried in a thermostat at 80° C. for 10 minutes, to obtain a multilayer film of the composition forming an impact absorption layer and the methacrylic resin composition. A sheet having a size of 150 mm in length×150 mm in width, which was obtained by cutting the multilayer film of the composition forming an impact absorption layer and the methacrylic resin composition, a polyimide film (KAPTON Film, manufactured by Du Pont-Toray Co., Ltd., 75 mm in length×150 mm in width×0.05 mm in thickness), and a polypropylene sheet (MA3, manufactured by Nippon Polypropylene Corporation, 150 mm in length×150 mm in width×0.4 mm in thickness) were superimposed in this order, and disposed in the center of a metal-made spacer having an inside dimension of 150 mm×150 mm and 0.8 mm in thickness. During this time, the layer made of the composition forming an impact absorption layer was disposed so as to come into contact with the polypropylene sheet and the polyimide film. The thus superimposed sheet and metal-made spacer were put between polytetrafluoroethylene-made sheets, and further put between metal plates from the outside. The resultant was subjected to compression molding with a compression molding machine for 2 minutes under a condition at 130° C. and at a load of 50 kgf/cm$^2$, to obtain a multilayer film of the methacrylic resin composition, the composition forming an impact absorption layer, and the polypropylene.

The multilayer film was cut in a width of 25 mm as a test piece for adhesive strength measurement, and a peel strength between the composition forming an impact absorption layer and the polypropylene was measured with a peel tester (AGS-X, manufactured by Shimadzu Corporation) under a condition at a peeling angle of 180°, at a tensile speed of 100 mm/min, and an environmental temperature of 23° C. in conformity with JIS K6854-2 and defined as an adhesive strength (PP) of the composition.

[Adhesive Strength (ABS) of Composition Forming Impact Absorption Layer (1)]

A peel strength measured in the same contents as those described in the aforementioned section of [Adhesive Strength (PP) of Composition Forming Impact Absorption Layer (1)], except for using a sheet (150 mm in length×150 mm in width×0.4 mm in thickness) made of ABS (KRALASTIC MTH-2, manufactured by Nippon A&L Inc.) in place of the polypropylene sheet was defined as the adhesive strength (ABS) of each of the compositions shown in Production Examples X1, X3, and X5.

[Adhesive Strength (ABS) of Composition Forming Impact Absorption Layer (2)]

A peel strength measured in the same contents as those described in the aforementioned section of [Adhesive Strength (PP) of Composition Forming Impact Absorption Layer (2)], except for using a sheet (150 mm in length×150 mm in width×0.4 mm in thickness) made of ABS (KRALASTIC MTH-2, manufactured by Nippon A&L Inc.) in place of the polypropylene sheet was defined as the adhesive strength (ABS) of each of the compositions shown in Production Examples X2, X4, and X6.

Methods of preparing the multilayer films, decorative films, and molded bodies used for evaluating the peel strength and the chipping resistance of the films in the respective Examples and Comparative Examples are hereunder described.

[Base Material Layer (b1)]

The pellets (N-2) of the methacrylic resin composition obtained in Production Example 10 was used as the resin forming the base material layer (b1).

[Base Material Layer (b2)]

A polypropylene-based resin CALP-E4361-1, manufactured by Idemitsu Lion Composites Co., Ltd. (talc blended, melting point=125° C., quantity of heat of fusion=404 mJ, degree of crystallization=27 (value in terms of a polypropylene matrix), MFR=0.9 g/10 min) was used as the base material layer (b2).

[Base Material Layer (b3)]

A polystyrene-based resin 475D, manufactured by PS Japan Corporation (impact resistant polystyrene, MFR=2.0 g/10 min (at 200° C. and 5 kgf) was used as the base material layer (b3).

[Decorative Layer (d1)]

As the decorative layer (d1), the pellets of the methacrylic resin composition (N-1) shown in Production Example 8 were melted at 270° C. with a φ65 mm vent-equipped single-screw extruder connected with a T-die and extruded in a sheet-like state having a width of 700 mm from the T-die. A distance from a die discharge portion to a portion in which the thermoplastic resin composition in a molten state came into contact with a cast roll was fixed to 30 mm, and the extruded thermoplastic resin composition was brought into intimate contact with the cast roll having a diameter of 225 mm upon application of static electricity (edge pinning, voltage: 4 V, at a position of 5 mm in the vertical direction and 10 mm toward the T-die side from the contact point of the cast roll) and cooled, to form a raw film having a thickness of 75 μm. On the obtained raw film, an indium layer having a thickness of 50 nm was formed by means of vacuum vapor deposition with a vacuum vapor deposition apparatus (VE-2030, manufactured by Shinku Device K.K., resistance heating type), to obtain the decorative layer (d1) that is a metal tone decorative film. During this time, a basket heater (alumina: 92%) was used for the resistance heating, and indium having a purity of 99.99% and a grain size of 1 mm was used as the indium. The vapor deposition condition was a degree of vacuum of $7\times10^{-3}$ Pa, a rate of 0.8 angstroms/sec, and a time of 10 minutes.

Example 1

[Molding Method 1: Preparation of Molded Body (Coextrusion-Thermal Lamination-TOM)]

The thermoplastic polymer composition obtained in Production Example X1 was used for each of the impact absorption layer (a) and the pressure sensitive adhesive layer (c), and these thermoplastic polymer compositions and the pellets (N-2) of the resin composition forming the base material layer (b1) were respectively added in hoppers of a single-screw molding machine (VGM25-28EX, manufactured by G.M. Engineering Co., Ltd.) and coextruded at 240° C. and at a flow rate of 5 kg/h by using a multimanifold die, to obtain a multilayer film having a width of 30 cm and a thickness of 300 μm. The constitution of the obtained multilayer film was the pressure sensitive adhesive layer (c) having a thickness of 50 μm, the base material layer (b) having a thickness of 200 μm, and the impact resistant layer (a) having a thickness of 50 μm from the side coming into contact with the decorative layer (d). Subsequently, using a thermal lamination device (VAII-700 Type, manufactured by Taisei Laminator Co., Ltd.), the aforementioned multilayer film and the decorative layer (d1) were passed through heat rolls at 130° C. in a state that the pressure sensitive adhesive layer (c) of the multilayer film came into contact with the indium layer of the decorative layer (d1) and laminated to obtain a decorative film.

Subsequently, a molded body was produced by using the aforementioned decorative film. That is, using a vacuum pressure molding machine (NGF-0406-T, manufactured by Fu-se Vacuum Forming Co., Ltd.) which forms a chamber box (CB) by closing a chamber box (CB1) and a chamber box (CB2), the three-dimensional overlay method was conducted. A polypropylene molded body having a size of 100 mm in length×40 mm in width×3 mm in thickness, which was obtained by adding polypropylene (J708UG, manufactured by Prime Polymer Co., Ltd.) in an injection molding machine (SG-100, manufactured by Sumitomo Heavy Industries, Ltd.) and injecting at 230° C., was used as an adherend. The multilayer film and the adherend were put into the chamber box (CB2) of the molding machine, in such a manner that the impact absorption layer (a) of the multilayer film from which the release PET film had been released faced on the polypropylene molded body as the adherend. Then, the decorative film was put between the chamber box (CB1) and the chamber box (CB2) in such that the decorative film divided the chamber box (CB) into two parts, and the chamber box (CB1) and the chamber box (CB2) were closed to form the chamber box (CB). Thereafter, the pressure of the inside of the chamber box (CB) was reduced to 0.5 kPa within 90 seconds. During this, the decorative film was warped due to non-equilibrium of the degree of pressure reduction and the self-weight of the multiplayer film, and therefore, the decorative film was kept horizontally by appropriately adjusting the pressure in each of the chamber box (CB1) and the chamber box (CB2). In parallel with the pressure reduction, the decorative film was heated for 120 seconds by an infrared heating device, and when the temperature of the decorative film reached 130° C., the inside of the chamber box (CB1) was quickly returned to atmospheric pressure, thereby covering the adherend with the decorative film and molding a three-dimensional overlay decorative molded body in which the decorative film in a non-stretched state was adhered onto the adherend. The temperature of the decorative film was measured by a radiation thermometer. Thereafter, the chamber box (CB) was opened, and the molded body was taken out from the chamber box (CB2). There was thus produced a molded body having a size of 100 mm in length×40 mm in width×3 mm in thickness, in which the decorative film was laminated on the polypropylene molded body.

Example 2

A molded body in which a decorative film was laminated on a polypropylene molded body was produced in the same manner as in Example 1, except that in the production method of the molded body in which a decorative film was laminated on the polypropylene molded body as described in Example 1, the thickness of the sheet made of one in Production Example X1 was changed to 100 μm.

Example 3

A molded body in which a decorative film was laminated on a polypropylene molded body was produced in the same manner as in Example 1, except that in the production method of the molded body in which a decorative film was laminated on the polypropylene molded body as described in Example 1, the material of the pressure sensitive adhesive layer (c) was changed from Production Example X1 to Production Example X2, and the thickness of each of the impact absorption layer (a) and the pressure sensitive adhesive layer (c) was changed to 100 μm.

Comparative Example 1

A molded body in which a decorative film was laminated on a polypropylene molded body was produced in the same manner as in Example 1, except that in the production method of the molded body in which a decorative film was laminated on the polypropylene molded body as described in Example 1, the material of each of the impact absorption layer (a) and the pressure sensitive adhesive layer (c) was changed from Production Example X1 to Production Example X5.

Comparative Example 2

A molded body in which a decorative film was laminated on a polypropylene molded body was produced in the same manner as in Example 1, except that in the production method of the molded body in which a decorative film was laminated on the polypropylene molded body as described in Example 1, the material of each of the impact absorption layer (a) and the pressure sensitive adhesive layer (c) was changed from Production Example X1 to Production Example X5, and the thickness of each of these layers was changed to 100 μm.

Example 4

[Molding Method 2: Preparation of Molded Body (Coextrusion-Thermal Lamination-Injection Molding)]

The thermoplastic polymer composition obtained in Production Example X3 was used for each of the impact absorption layer (a) and the pressure sensitive adhesive layer (c), and these thermoplastic polymer compositions and the pellets of the resin composition forming the base material layer (b2) were respectively added in hoppers of a single-screw molding machine (VGM25-28EX, manufactured by G.M. Engineering Co., Ltd.) and coextruded at 240° C. and at a flow rate of 5 kg/h by using a multimanifold die, to obtain a multilayer film having a width of 30 cm and a thickness of 200 μm. The constitution of the obtained multilayer film was the pressure sensitive adhesive layer (c) having a thickness of 50 μm, the base material layer (b2) having a thickness of 100 μm, and the impact resistant layer (a) having a thickness of 50 μm from the side coming into contact with the decorative layer (d1). Subsequently, using a thermal lamination device (VAII-700 Type, manufactured by Taisei Laminator Co., Ltd.), the aforementioned multilayer film and the decorative layer (d1) were passed through heat rolls at 130° C. in a state that the pressure sensitive adhesive layer (c) of the multilayer film came into contact with the indium layer of the decorative layer (d1) and laminated to obtain a decorative film. Subsequently, using the aforementioned decorative film and a polypropylene resin (MA3, manufactured by Nippon Polypropylene Corporation), the decorative film was accommodated in a die of a direct pressure type hydraulic molding machine (M-100C-AS-DM, manufactured by MEIKI CO., LTD.), a mobile mold and an immobile mold were clamped, and a molten resin of the polypropylene resin was injected into the cavity at 230° C. There was thus produced a molded body having a size of 100 mm in length×40 mm in width×3 mm in thickness, in which the decorative film was laminated on the polypropylene molded body.

Example 5

A molded body in which a decorative film was laminated on a polypropylene molded body was produced in the same manner as in Example 4, except that in the production method of the molded body in which a decorative film was laminated on the polypropylene molded body as described in Example 4, the thickness of the base material layer (b2) was changed to 200 μm.

Example 6

A molded body in which a decorative film was laminated on a polypropylene molded body was produced in the same manner as in Example 4, except that in the production method of the molded body in which a decorative film was laminated on the polypropylene molded body as described in Example 4, the thickness of each of the impact absorption layer (a) and the pressure sensitive adhesive layer (c) was changed to 100 μm.

Example 7

A molded body in which a decorative film was laminated on a polypropylene molded body was produced in the same manner as in Example 4, except that in the production method of the molded body in which a decorative film was laminated on the polypropylene molded body as described in Example 4, the thickness of the base material layer (b2) was changed to 200 μm, and the thickness of each of the impact absorption layer (a) and the pressure sensitive adhesive layer (c) was changed to 100 μm.

Example 8

A molded body in which a decorative film was laminated on an ABS molded body was produced in the same manner as in Example 4, except that in the production method of the molded body in which a decorative film was laminated on the polypropylene molded body as described in Example 4, the polypropylene was changed to ABS (KRALASTIC MTH-2, manufactured by Nippon A&L Inc.).

Example 9

[Molding Method 3: Preparation of Molded Body (Coextrusion-Coating-Thermal Lamination-TOM)]

Pellets of the thermoplastic polymer composition described in Production Example X4 were dissolved in toluene to prepare a 30% by weight toluene solution. On a 75 μm-thick release PET film (K1504, manufactured by Toyobo Co., Ltd.), the aforementioned 30% by weight toluene solution was coated in a wet thickness of 126 μm by using a #55 bar coater. Subsequently, the resultant was dried in a thermostat at 80° C. for 10 minutes, to obtain a 40 μm-thick multilayer film of the thermoplastic polymer composition (X4) and the release PET film. Subsequently, the composition pellets of Production Example X3 as the impact absorption layer (a) and pellets of the resin composition forming the base material layer (b2) were respectively added in hoppers of a single-screw molding machine (VGM25-28EX, manufactured by G.M. Engineering Co., Ltd.) and coextruded at 240° C. and at a flow rate of 5 kg/h by using a multimanifold die, to obtain a multilayer film having a width of 30 cm and a thickness of 300 μm. The constitution of the obtained multilayer film was the base material layer (b2) having a thickness of 200 μm and the impact resistance layer (a) having a thickness of 100 μm. Subsequently, using a thermal lamination device (VAII-700 Type, manufactured by Taisei Laminator Co., Ltd.), the aforementioned multilayer film of the thermoplastic polymer composition and the release PET film and the aforementioned multilayer film were passed through heat rolls at 25° C. in a state that the base layer (b2) of the multilayer film and the thermoplastic polymer composition (X4) came into contact with each other and laminated to obtain a multilayer film having a constitution of the pressure sensitive adhesive layer (c) having a thickness of 40 μm, the base material layer (b2) having a thickness of 200 μm, and the impact absorption layer (a) having a thickness of 100 μm in order from the side coming into contact with the decorative layer (d1). Subsequently, using a thermal lamination device (VAII-700 Type, manufactured by Taisei Laminator Co., Ltd.), the aforementioned multilayer film and the decorative layer (d1) were passed through heat rolls at 130° C. in a state that the pressure sensitive adhesive layer (c) of the multilayer film came into contact with the decorative layer (d1) and laminated to obtain a thermally laminated multilayer film. Subsequently, using the aforementioned thermally laminated multilayer film, a molded body was produced in the same method as that described in Example 1. There was thus produced a molded body having a size of 100 mm in length×40 mm in width×3 mm in thickness, in which the multilayer film was laminated on the polypropylene molded body.

Example 10

A molded body in which a decorative film was laminated on a polypropylene molded body was produced in the same manner as in Example 9, except that in the production method of the molded body in which a decorative film was laminated on the polypropylene molded body as described in Example 9, the material of the pressure sensitive adhesive layer (c) was changed from Production Example X4 to the Production Example X6.

Example 11

A molded body in which a decorative film was laminated on a polypropylene molded body was produced in the same manner as in Example 1, except that in the production method of the molded body in which a decorative film was laminated on the polypropylene molded body as described in Example 1, the material of each of the impact absorption layer (a) and the pressure sensitive adhesive layer (c) was changed from Production Example X1 to Production Example X7.

Example 12

A molded body in which a decorative film was laminated on a polypropylene molded body was produced in the same manner as in Example 11, except that in the production method of the molded body in which a decorative film was laminated on the polypropylene molded body as described in Example 11, the material of the base material layer (b1) was changed to that of the base material layer (b3).

Comparative Example 3

A molded body in which a decorative film was laminated on a polypropylene molded body was produced in the same manner as in Example 4, except that in the production method of the molded body in which a decorative film was laminated on the polypropylene molded body as described in Example 4, the material of each of the impact absorption layer (a) and the pressure sensitive adhesive layer (c) was changed from Production Example X3 to Production Example X5.

Comparative Example 4

A molded body in which a decorative film was laminated on a polypropylene molded body was produced in the same manner as in Example 4, except that in the production method of the molded body in which a decorative film was laminated on the polypropylene molded body as described in Example 4, the material of each of the impact absorption layer (a) and the pressure sensitive adhesive layer (c) was changed from Production Example X3 to Production Example X5, and the thickness of each of these layers was changed to 100 μm.

Comparative Example 5

A molded body in which a decorative film was laminated on an ABS molded body was produced in the same manner as in Comparative Example 3, except that in the production method of the molded body in which a decorative film was laminated on the polypropylene molded body as described in Comparative Example 3, the polypropylene was changed to ABS (KRALASTIC MTH-2, manufactured by Nippon A&L Inc.).

[Adhesive Strength between Decorative Layer (d) and Pressure Sensitive Adhesive Layer (c)]

Using the molded body having a decorative film laminated thereon, the adhesive strength between the decorative layer (d) and the pressure sensitive adhesive layer (c) was evaluated. In the thermal lamination step of the aforementioned Molding Methods 1 to 3, a polyimide film (KAPTON Film, manufactured by Du Pont-Toray Co., Ltd., 30 mm in length×40 mm in width×0.05 mm in thickness) was disposed between the decorative layer (d) and the pressure sensitive adhesive layer (c), to obtain a molded body. The decorative layer (d) in a portion at which the aforementioned polyimide film was disposed was grasped and then released by fingers toward the direction of about 90° against the adherend. The adhesive strength between the decorative layer (d) and the pressure sensitive adhesive layer (c) was evaluated according to the following criteria.
A: Firmly adhered
C: Easily releasable

[Adhesive Strength between Adherend and Multilayer Film]

Using the molded body having a decorative film laminated thereon, the adhesive strength between the polypropylene molded body or ABS molded body as the adherend and the multilayer film was evaluated. In the TOM molding or injection molding step of the aforementioned Molding Methods 1 to 3, a polyimide film (KAPTON Film, manufactured by Du Pont-Toray Co., Ltd., 30 mm in length×40 mm in width×0.05 mm in thickness) was disposed between the adherend and the impact absorption layer (a), to obtain a molded body. The decorative layer (d) in a portion at which the aforementioned polyimide film was disposed and the multilayer film were grasped and then released by fingers toward the direction of about 90° against the adherend. The adhesive strength between the adherend and the multilayer layer was evaluated according to the following criteria.
A: Firmly adhered
C: Easily releasable

[Evaluation of Chipping Resistance of Molded Body]

Using a gravelometer, manufactured by Suga Test Instruments Co., Ltd., 50 g of a No. 7 crushed stone was collided on the surface of the decorative layer (d) of the molded body from a distance of 350 mm far from a test piece under a condition of test piece temperature=−20° C., angel=90° against the shot material blowing axis, air pressure=0.4 MPa, and the surface of the molded body after collision was visually observed.
A: Peeling was not observed.
B: Peeling was observed in 1 to 9 portions.
C: Peeling was observed in 10 or more portions.

Constitutions of the multilayer films and evaluation results in the respective Examples and respective Comparative Examples are shown in Tables 2 and 3.

TABLE 2

| | | | Example 1 | Example 2 | Example 3 | Example 4 | Example 5 | Example 6 |
|---|---|---|---|---|---|---|---|---|
| Decorative layer (d) | Material | | Production Example d1 | Production Example d1 | Production Example d1 | Production Example d1 | Production Example d1 | Production Example d1 |
| | Thickness | μm | 75 | 75 | 75 | 75 | 75 | 75 |
| Pressure sensitive adhesive layer (c) | Material | | Production Example X1 | Production Example X1 | Production Example X2 | Production Example X3 | Production Example X3 | Production Example X 3 |
| | Thickness | μm | 50 | 100 | 100 | 50 | 50 | 100 |
| Base material layer (b) | Material | | Base material layer b1 | Base material layer b1 | Base material layer b1 | Base material layer b2 | Base material layer b2 | Base material layer b2 |
| | Thickness | μm | 200 | 200 | 200 | 100 | 200 | 100 |
| Impact absorption layer (a) | Material | | Production Example X1 | Production Example X1 | Production Example X1 | Production Example X3 | Production Example X3 | Production Example X3 |
| | Thickness | μm | 50 | 100 | 100 | 50 | 50 | 100 |
| Molding method | | | Molding Method 1 | Molding Method 1 | Molding Method 1 | Molding Method 2 | Molding Method 2 | Molding Method 2 |
| Adherend | | | PP | PP | PP | PP | PP | PP |
| Viscoelasticity of composition forming impact absorption layer (a) | tan δ (minimum value at −50 to −20° C.) | | 1.5E−01 | 1.5E−01 | 1.5E−01 | 2.4E−01 | 2.4E−01 | 2.4E−01 |
| Adhesive strength between decorative layer (d) and pressure sensitive adhesive layer (c) | | | A | A | A | A | A | A |
| Adhesive strength between adherend and multilayer film | | | A | A | A | A | A | A |
| Chipping resistance of molded body | | | A | A | A | A | A | A |

| | | | Example 7 | Example 8 | Example 9 | Example 10 | Example 11 | Example 12 |
|---|---|---|---|---|---|---|---|---|
| Decorative layer (d) | Material | | Production Example d1 | Production Example d1 | Production Example d1 | Production Example d1 | Production Example d1 | Production Example d1 |
| | Thickness | μm | 75 | 75 | 75 | 75 | 75 | 75 |
| Pressure sensitive adhesive layer (c) | Material | | Production Method X3 | Production Method X3 | Production Method X4 | Production Method X6 | Production Method X7 | Production Method X7 |
| | Thickness | μm | 100 | 50 | 40 | 40 | 50 | 50 |

TABLE 2-continued

| Base material layer (b) | Material | Base material layer b2 | Base material layer b2 | Base material layer b2 | Base material layer b2 | Base material layer b1 | Base material layer b3 |
|---|---|---|---|---|---|---|---|
| | Thickness μm | 200 | 100 | 200 | 200 | 200 | 200 |
| Impact absorption layer (a) | Material | Production Method X3 | Production Method X3 | Production Method X3 | Production Method X3 | Production Method X7 | Production Method X7 |
| | Thickness μm | 100 | 50 | 100 | 100 | 50 | 50 |
| Molding method | | Molding Method 2 | Molding Method 2 | Molding Method 3 | Molding Method 3 | Molding Method 1 | Molding Method 1 |
| Adherend | | PP | ABS | PP | PP | PP | PP |
| Viscoelasticity of composition forming impact absorption layer (a) | tan δ (minimum value at −50 to −20° C.) | 2.4E−01 | 2.4E−01 | 2.4E−01 | 2.4E−01 | 7.5E−02 | 7.5E−02 |
| Adhesive strength between decorative layer (d) and pressure sensitive adhesive layer (c) | | A | A | A | A | A | A |
| Adhesive strength between adherend and multilayer film | | A | A | A | A | A | A |
| Chipping resistance of molded body | | A | A | A | A | A | A |

TABLE 3

| | | Comparative Example 1 | Comparative Example 2 | Comparative Example 3 | Comparative Example 4 | Comparative Example 5 |
|---|---|---|---|---|---|---|
| Decorative layer (d) | Material | Production Example d1 | Production Example d1 | Production Example d1 | Production Example d1 | Production Example d1 |
| | Thickness μm | 75 | 75 | 75 | 75 | 75 |
| Pressure sensitive adhesive layer (c) | Material | Production Example X5 | Production Example X5 | Production Example X5 | Production Example X5 | Production Example X5 |
| | Thickness μm | 50 | 100 | 50 | 100 | 50 |
| Base material layer (b) | Material | Base material layer b1 | Base material layer b1 | Base material layer b2 | Base material layer b2 | Base material layer b2 |
| | Thickness μm | 200 | 200 | 200 | 200 | 200 |
| Impact absorption layer (a) | Material | Production Example X5 | Production Example X5 | Production Example X5 | Production Example X5 | Production Example X5 |
| | Thickness μm | 50 | 100 | 50 | 100 | 50 |
| Molding method | | Molding Method 1 | Molding Method 1 | Molding Method 2 | Molding Method 2 | Molding Method 2 |
| Adherend | | PP | PP | PP | PP | ABS |
| Viscoelasticity of composition forming impact absorption layer (a) | tan δ (minimum value at −50 to −20° C.) | 2.7E−02 | 2.7E−02 | 2.7E−02 | 2.7E−02 | 2.7E−02 |
| Adhesive strength between decorative layer (d) and pressure sensitive adhesive layer (c) | | A | A | A | A | A |
| Adhesive strength between adherend and multilayer film | | A | A | A | A | A |
| Chipping resistance of molded body | | C | C | C | C | C |

The tangent loss (tan δ) of the thermoplastic polymer composition used in the impact absorption layer (a) of the multilayer film of Example 1 in a range of −50 to −20° C. at 11 Hz was $3 \times 10^{-2}$ or more. In addition, the decorative film composed of the aforementioned thermoplastic polymer composition exhibited a strong adhesive strength to the polypropylene molded body. In view of the fact that the molded body having such a decorative film laminated thereon was excellent in low-temperature impact resistance, high chipping resistance was revealed. In addition, the thermoplastic polymer composition used in the impact absorption layer (a) of Example 1 is also excellent in the adhesive strength to ABS. According to this, it has become clear that the multilayer film of the present invention is suitable as a decorative film which is excellent in chipping resistance and has favorable adhesive properties to a variety of resin materials, such as polypropylene and ABS. In addition, the molded body composed of the multilayer film of Example 2 in which the thickness of the impact absorption layer (a) is increased as compared with Example 1 exhibited excellent chipping resistance. On the other hand, in the multilayer film of Comparative Example 1 in which the impact absorption layer (a) was changed from Production Example X1 to Production Example X5, an excellent adhesive strength to the polypropylene was exhibited; however, the tangent loss (tan δ) at 11 Hz of the thermoplastic polymer composition forming the impact absorption layer (a) in a range of −50 to −20° C. was smaller than $3 \times 10^{-2}$, and therefore, the chipping resistance of the molded body thereof was worse.

The multilayer films of Examples 2 and 3 are a multilayer film in which the thickness of the impact absorption layer (a) or the material of the pressure sensitive adhesive layer (c) in the multilayer film of Example 1 is changed; however, similar to Example 1, the tangent loss (tan δ) at 11 Hz of the thermoplastic polymer composition used in the impact absorption layer (a) in a range of −50 to −20° C. was $3 \times 10^{-2}$ or more, and furthermore, a strong adhesive strength to the polypropylene molded body was exhibited, and therefore, excellent chipping resistance was exhibited. The multilayer films of Examples 4 to 7, 9, and 10 are a multiplayer film in which the molding method of Example 1 was changed, and furthermore, the kind or thickness of the impact absorption layer (a), the kind or thickness of the base material layer (b), or the kind or thickness of the pressure sensitive adhesive layer (c) was changed; however, similar to Example 1, the tangent loss (tan δ) at 11 Hz of the thermoplastic polymer composition used in the impact absorption layer (a) in a range of −50 to −20° C. was $3\times10^{-2}$ or more, and furthermore, a strong adhesive strength to the polypropylene molded body was exhibited, and therefore, excellent chipping resistance was exhibited. In addition, though the multilayer film of Example 8 is identical with the multilayer film of Example 4, even in the case of changing the adherend from pp to ABS, the impact absorption layer (a) of Production Example X3 exhibited an excellent adhesive strength to ABS, and therefore, the multilayer film thereof also exhibited an excellent adhesive strength to ABS and had favorable chipping resistance. In addition, the multilayer films of Examples 11 and 12 are a multilayer film in which the materials of the impact absorption layer (a) and the pressure sensitive adhesive layer (c) or the base material layer (b) in the multilayer film of Example 1 were changed; however, similar to Example 1, the tangent loss (tan δ) at 11 Hz of the thermoplastic polymer composition used in the impact absorption layer (a) in a range of −50 to −20° C. was $3\times10^{-2}$ or more, and furthermore, a strong adhesive strength to the polypropylene molded body was exhibited, and therefore, excellent chipping resistance was exhibited.

On the other hand, in the multilayer films of Comparative Examples 2 to 5, the tangent loss (tan δ) at 11 Hz of the thermoplastic polymer composition forming the impact absorption layer (a) in a range of −50 to −20° C. was smaller than $3\times10^{-2}$, and therefore, though a favorable adhesive strength to polypropylene and ABS was exhibited, similar to Comparative Example 1, the chipping resistance of the molded body thereof was worse.

In the light of the above, the multilayer film of the present invention is excellent in adhesive strength to polypropylene or ABS and excellent in chipping resistance of a molded body using the multilayer film, it can be suitably used especially as a multilayer film to be used for vehicle exterior finishes.

This application claims priority to Japanese Patent Application No. 2018-077471 filed on Apr. 13, 2018, the disclosure of which is hereby incorporated in its entirety.

The invention claimed is:

1. A multilayer film comprising an impact absorption layer (a), a base material layer (b), and a pressure sensitive adhesive layer (c) disposed in this order therein,
   wherein the impact absorption layer (a) and the pressure sensitive adhesive layer (c) comprise a thermoplastic polymer composition which satisfies the following (a1):
   (a1) the thermoplastic polymer composition contains a thermoplastic elastomer (P) composed of at least one block copolymer containing a polymer block (X) containing a structural unit derived from an aromatic vinyl compound and a polymer block (Y) containing a structural unit derived from a conjugated diene compound, or a hydrogenated product of the polymer block (Y);
   wherein the impact absorption layer (a) and the pressure sensitive adhesive layer (c) contain a polypropylene-based resin (Q);
   wherein the impact absorption layer (a) has a loss tangent (tan δ) at 11 Hz in a range of −50 to −20° C. of $3\times10^{-2}$ or more; and
   wherein the pressure sensitive adhesive layer (c) has a loss tangent (tan δ) at 11 Hz in a range of −50 to −20° C. of $3\times10^{-2}$ to $2.4\times10^{-1}$.

2. The multilayer film according to claim 1, wherein the structural unit derived from the conjugated diene compound of the polymer block (Y) is a structural unit derived from at least one selected from butadiene and isoprene.

3. The multilayer film according to claim 1, wherein a decorative layer (d) is in contact with the pressure sensitive adhesive layer (c) of the multilayer film.

4. The multilayer film according to claim 3, wherein the decorative layer (d) is a transparent thermoplastic resin selected from any of a (meth)acrylic resin, an ABS resin, a polycarbonate-based resin, and a polyester-based resin.

5. The multilayer film according to claim 4, wherein the decorative layer (d) is composed of a multilayer layer in which any of a metal vapor deposition layer and a printed layer is formed in a film of the transparent thermoplastic resin.

6. The multilayer film according to claim 4, wherein the decorative layer (d) is composed of a multilayer layer in which the transparent thermoplastic resin contains one or both of a pigment and a dye.

7. The multilayer film according to claim 1, wherein the multilayer film is a decorative film.

8. The multilayer film according to claim 1, wherein the aromatic vinyl compound of the polymer block (X) includes a structural unit derived from α-methylstyrene.

9. The multilayer film according to claim 2, wherein a proportion of the sum total of the 1,2-bond amount and the 3,4-bond amount relative to the whole bond amount in the conjugated diene of the polymer block (Y) is 40 to 90 mol %.

10. A molded body comprising the multilayer film according to claim 1 provided on the surface of an adherend.

11. The molded body according to claim 10, wherein the adherend is composed of a polypropylene resin or an ABS resin.

12. A method for producing a multilayer film that is a method for producing the multilayer film according to claim 1, the method comprising coextruding the impact absorption layer (a), the base material layer (b), and the pressure sensitive adhesive layer (c).

13. The method for producing a multilayer film according to claim 12, wherein a silicone roll is used as a roll for nip molding.

14. A method for producing a multilayer film that is a method for producing the multilayer film according to claim 1, the method comprising forming the pressure sensitive adhesive layer (c) through solvent coating or extrusion lamination method on the base material layer (b) of a film formed by coextrusion of the impact absorption layer (a) and the base material layer (b).

15. A method for producing a molded body, the method comprising:
   accommodating the multilayer film according to claim 1 and an adherend in a chamber box;
   reducing the pressure in the chamber box;
   dividing the inside of the arranging the multilayer film so as to divide the chamber box into two parts sealed from each other by the multilayer film, one of the two parts exposed to the adherend; and
   making the pressure within the part of the chamber box not exposed to the adherend higher than the pressure within the part of the chamber box exposed to the adherend, to cover the adherend with the multilayer film.

16. The method for producing a molded body according to claim 15, further comprising heating the multilayer film to a range of 110 to 180° C. to soften it.

17. A method for producing a molded body, the method comprising:
preliminarily molding the multilayer film according to claim 1 through vacuum molding;
disposing the preliminarily molded multilayer film within a die such that the base material layer comes into contact with the die; and
after closing the die, subjecting a thermoplastic resin forming an adherend to injecting molding.

* * * * *